United States Patent
Sato et al.

(10) Patent No.: US 12,474,552 B2
(45) Date of Patent: Nov. 18, 2025

(54) OPTICAL ELEMENT AND IMAGE DISPLAY APPARATUS

(71) Applicant: FUJIFILM Corporation, Tokyo (JP)

(72) Inventors: Hiroshi Sato, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 711 days.

(21) Appl. No.: 17/880,061

(22) Filed: Aug. 3, 2022

(65) Prior Publication Data

US 2022/0390723 A1   Dec. 8, 2022

Related U.S. Application Data

(63) Continuation of application No. PCT/JP2021/003841, filed on Feb. 3, 2021.

(30) Foreign Application Priority Data

Feb. 4, 2020  (JP) ................................. 2020-017005

(51) Int. Cl.
  *G02B 15/14*   (2006.01)
  *G02B 30/56*   (2020.01)
  (Continued)

(52) U.S. Cl.
  CPC .......... *G02B 15/1425* (2019.08); *G02B 30/56* (2020.01); *G02F 1/133504* (2013.01);
  (Continued)

(58) Field of Classification Search
  CPC .. G02B 15/1425; G02B 30/56; G02B 5/3016; G02B 2027/0125; G02B 2027/0174;
  (Continued)

(56) References Cited

U.S. PATENT DOCUMENTS

| 2019/0086674 A1* | 3/2019 | Sinay ................. G02B 27/0093 |
| 2021/0026049 A1 | 1/2021 | Saitoh et al. |
| 2021/0088703 A1 | 3/2021 | Saitoh et al. |

FOREIGN PATENT DOCUMENTS

| CN | 107390380 A | 11/2017 |
| CN | 109445109 A | 3/2019 |

(Continued)

OTHER PUBLICATIONS

Japanese Notice of Reasons for Refusal for Japanese Application No. 2021-575822, dated Jul. 25, 2023, with an English translation.

(Continued)

*Primary Examiner* — Charles S Chang
(74) *Attorney, Agent, or Firm* — Birch, Stewart, Kolasch & Birch, LLP

(57) ABSTRACT

Provided are an optical element and an image display apparatus that display an aerial image, in which the total volume of the apparatus is small, a reduction in size can realized, and a scenery can be recognized. The optical element includes: a light guide element including a light guide plate, an incidence diffraction element, and an emission diffraction element, the incidence diffraction element being disposed on a main surface of the light guide plate and the emission diffraction element being disposed on the main surface of the light guide plate; and a positive lens that is disposed at a position overlapping the emission diffraction element in a view from a direction perpendicular to the main surface of the light guide plate, in which the incidence diffraction element diffracts incident light such that the diffracted light is incident into the light guide plate, the emission diffraction element emits light propagating in the light guide plate from the light guide plate, and the positive lens collects the light that is emitted from the light guide plate by the emission diffraction element.

22 Claims, 12 Drawing Sheets

(51) Int. Cl.
*G02F 1/1335* (2006.01)
*G03H 1/00* (2006.01)

(52) U.S. Cl.
CPC .. *G02F 1/133524* (2013.01); *G02F 1/133526* (2013.01); *G02F 1/133541* (2021.01); *G02F 1/133543* (2021.01); *G03H 1/0005* (2013.01); *G03H 2001/0088* (2013.01)

(58) Field of Classification Search
CPC ........ G02B 27/0172; G02B 5/18; G02B 5/32; G02F 1/133504; G02F 1/133524; G02F 1/133526; G02F 1/133541; G02F 1/133543; G03H 1/0005; G03H 2001/0088; G03H 2223/16; G03H 2240/15; G03H 2001/0439; G03H 2001/2239; G03H 2001/2284; G03H 2223/23; G03H 2270/55
See application file for complete search history.

(56) References Cited

FOREIGN PATENT DOCUMENTS

| | | |
|---|---|---|
| JP | 2003-337298 A | 11/2003 |
| JP | 2013-109211 A | 6/2013 |
| JP | 2018-40962 A | 3/2018 |
| WO | WO 2019/060741 A1 | 3/2019 |
| WO | WO 2019/189586 A1 | 10/2019 |
| WO | WO 2019/221294 A1 | 11/2019 |

OTHER PUBLICATIONS

International Preliminary Report on Patentability and Written Opinion of the International Searching Authority for International Application No. PCT/JP2021/003841, dated Aug. 18, 2022, with an English translation.
International Search Report for International Application No. PCT/JP2021/003841, dated Apr. 20, 2021, with an English translation.

* cited by examiner

OPTICAL ELEMENT AND IMAGE DISPLAY APPARATUS

CROSS-REFERENCE TO RELATED APPLICATIONS

This application is a Continuation of PCT International Application No. PCT/JP2021/003841 filed on Feb. 3, 2021, which claims priority under 35 U.S.C. § 119(a) to Japanese Patent Application No. 2020-017005 filed on Feb. 4, 2020. Each of the above applications is hereby expressly incorporated by reference, in its entirety, into the present application.

BACKGROUND OF THE INVENTION

1. Field of the Invention

The present invention relates to an optical element and an image display apparatus.

2. Description of the Related Art

As an image display apparatus that displays an image in the air, JP2013-109211A discloses a spatial image display device including a flat reflective plane-symmetric imaging element that reflects light from an object to an observer, in which the reflective plane-symmetric imaging element is formed of a light-transmitting cuboid having four surfaces extending in a longitudinal direction and includes a first mirror sheet and a second mirror sheet, the first mirror sheet and the second mirror sheet are formed by aligning a plurality of longitudinal members each of which has one of four surfaces as a light reflecting surface having a predetermined thickness such that the reflecting surfaces thereof face the same direction, cuboids are arranged in the first mirror sheet and the second mirror sheet such that the light reflecting surface of one cuboid abuts against a surface of an adjacent cuboid facing the light reflecting surface, the first mirror sheet and the second mirror sheet are laminated in a direction parallel to the light reflecting surface such that a first light reflecting surface of the first mirror sheet and a second light reflecting surface of the second mirror sheet are perpendicular to each other, and light from an object is reflected once from each of the light reflecting surfaces of the first mirror sheet and the second mirror sheet to form a real image.

In addition, JP2018-040962A describes an optical device including: a reflector array optical element in which a first reflection plate having a plurality of first reflecting surfaces disposed in parallel and a second reflection plate having a plurality of second reflecting surfaces disposed in parallel are laminated such that the first reflecting surfaces and the second reflecting surfaces are disposed perpendicular to each other; and a surface emitter that is disposed to face a back surface or a front surface of the reflector array optical element.

A display panel is disposed on one surface side of the optical device, and light emitted from the display panel is retroreflected by the optical device (reflector array optical element) in a plane direction. As a result, an aerial image is formed in the air on a surface side of the optical device opposite to the display panel side.

SUMMARY OF THE INVENTION

In the display devices shown in JP2013-109211A and JP2018-040962A, light emitted from the display element is retroreflected in a plane direction by the reflective plane-symmetric imaging element (reflector array) and is focused to form an aerial image at a position that is opposite to and plane-symmetric to the imaging element. Therefore, the display element is disposed such that a surface thereof is tilted with respect to the optical device. Thus, there is a problem in that the total volume of the image display apparatus increases.

In addition, in the display devices described in JP2013-109211A and JP2018-040962A, the reflective plane-symmetric imaging element (reflector array) is present behind the aerial image. Therefore, the scenery behind the reflective plane-symmetric imaging element (reflector array) cannot be recognized, and there is a problem in that AR display of displaying the scenery and the aerial image to be superimposed on each other cannot be performed.

An object of the present invention is to solve the above-described problem of the related art and to provide: an optical element and an image display apparatus that display an aerial image, in which the total volume of the apparatus is small, a reduction in size can realized, and a scenery can be recognized.

In order to achieve the object, the present invention has the following configurations.

[1] An optical element comprising:
  a light guide element including a light guide plate, an incidence diffraction element, and an emission diffraction element,
  the incidence diffraction element being disposed on a main surface of the light guide plate and
  the emission diffraction element being disposed on the main surface of the light guide plate; and
  a positive lens that is disposed at a position overlapping the emission diffraction element in a view from a direction perpendicular to the main surface of the light guide plate,
  in which the incidence diffraction element diffracts incident light such that the diffracted light is incident into the light guide plate,
  the emission diffraction element emits light propagating in the light guide plate from the light guide plate, and
  the positive lens collects the light that is emitted from the light guide plate by the emission diffraction element.

[2] The optical element according to [1],
  in which the light guide element and the positive lens are spaced from each other.

[3] The optical element according to [1] or [2],
  in which the positive lens is larger than the emission diffraction element.

[4] The optical element according to any one of [1] to [3], further comprising:
  a negative lens that is disposed on a side of the light guide element opposite to the positive lens.

[5] The optical element according to [4],
  in which the light guide element and the negative lens are spaced from each other.

[6] The optical element according to [4] or [5],
  in which in a case where a focal length of the positive lens is represented by +fp and a focal length of the negative lens is represented by −fn, fp and fn satisfy $0.7 \leq fn/fp \leq 1.3$.

[7] The optical element according to any one of [4] to [6], in which the negative lens is a focus tunable lens.

[8] The optical element according to any one of [4] to [7], in which the negative lens is any one of a surface relief type diffraction element, a volume hologram type diffraction element, or a polarization diffraction element.

[9] The optical element according to any one of [1] to [8],
in which the positive lens is a focus tunable lens.

[10] The optical element according to any one of [1] to [9],
in which the positive lens is any one of a surface relief type diffraction element, a volume hologram type diffraction element, or a polarization diffraction element.

[11] The optical element according to any one of [1] to [10],
in which the light guide element includes an intermediate diffraction element disposed on the main surface of the light guide plate, and
the intermediate diffraction element diffracts the light that is diffracted by the incidence diffraction element to be incident into the light guide plate and propagates in the light guide plate toward the emission diffraction element.

[12] The optical element according to [11],
in which a period of a diffraction structure of the intermediate diffraction element is 0.1 μm to 1 μm.

[13] The optical element according to [11] or [12],
in which the intermediate diffraction element is any one of a surface relief type diffraction element, a volume hologram type diffraction element, or a polarization diffraction element.

[14] The optical element according to any one of [1] to [13],
in which each of the incidence diffraction element and the emission diffraction element is any one of a surface relief type diffraction element, a volume hologram type diffraction element, or a polarization diffraction element.

[15] The optical element according to any one of [8], [10], [13], and [14],
in which the polarization diffraction element is a liquid crystal diffraction element that includes a liquid crystal layer including a liquid crystal compound, and
the liquid crystal layer has a liquid crystal alignment pattern in which a direction of an optical axis derived from the liquid crystal compound changes while continuously rotating in at least one in-plane direction.

[16] The optical element according to [15],
in which the liquid crystal layer has a region in which the direction of the optical axis of the liquid crystal compound is twisted and rotates in a thickness direction.

[17] The optical element according to [15] or [16],
in which the liquid crystal layer is a cholesteric liquid crystal layer obtained by immobilizing a cholesteric liquid crystalline phase.

[18] The optical element according to any one of [15] to [17],
in which in a case where an in-plane retardation is measured from a normal direction of a main surface of the liquid crystal diffraction element and a direction tilted with respect to a normal line, a direction in which the in-plane retardation is the minimum in any one of a slow axis plane or a fast axis plane is tilted from the normal direction.

[19] The optical element according to any one of [15] to [18],
in which the liquid crystal diffraction element includes two or more liquid crystal layers, and
in a cross section of each of the two or more liquid crystal layers observed with a scanning electron microscope, bright portions and dark portions derived from a liquid crystal phase are tilted with respect to a main surface of the liquid crystal layer, and
in a case where an interval between bright portions or between dark portions in a normal direction with respect to a tilted surface is set as ½ pitch, pitches of the liquid crystal layers are different from each other.

[20] The optical element according to [19],
in which in a case where a length over which the direction of the optical axis derived from the liquid crystal compound in the liquid crystal alignment pattern of the liquid crystal layer rotates by 180° in an in-plane direction is set as a single period of a diffraction structure,
single periods of the two or more liquid crystal layers are different from each other.

[21] The optical element according to [20],
in which the liquid crystal diffraction element includes a first liquid crystal layer and a second liquid crystal layer, and
in a case where a pitch of the first liquid crystal layer is represented by P1, a single period of the first liquid crystal layer is represented by Λ1, a pitch of the second liquid crystal layer is represented by P2, and a single period of the second liquid crystal layer is represented by Λ2,
P1<P2 and
Λ1<Λ2
are satisfied.

[22] The optical element according to any one of [1] to [21],
in which periods of diffraction structures of the incidence diffraction element and the emission diffraction element are 0.1 μm to 1 μm.

[23] An image display apparatus comprising:
the optical element according to any one of [1] to [22]; and
a display element that emits an image to the incidence diffraction element of the optical element.

[24] The image display apparatus according to [23],
in which the display element emits polarized light.

[25] The image display apparatus according to [24],
in which the display element emits circularly polarized light.

According to an aspect of the present invention, it is possible to provide: an optical element and an image display apparatus that display an aerial image, in which the total volume of the apparatus is small, a reduction in size can realized, and a scenery can be recognized.

DESCRIPTION OF THE PREFERRED EMBODIMENTS

Hereinafter, an optical element and an image display apparatus according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, a selective reflection center wavelength refers to an average value of two wavelengths at which, in a case where a minimum value of a transmittance of a target object (member) is represented by Tmin (%), a half value transmittance: T½(%) represented by the following expression is exhibited.

Expression for obtaining Half Value Transmittance: T½=100−(100−Tmin)÷2

In addition, selective reflection center wavelengths of a plurality of layers being "equal" does not represent that the selective reflection center wavelengths are exactly equal, and error is allowed in a range where there are no optical effects. Specifically, selective reflection center wavelengths of a plurality of objects being "equal" represents a difference between the selective reflection center wavelengths of the respective objects is 20 nm or less, and this difference is preferably 15 nm or less and more preferably 10 nm or less.

[Optical Element]

The optical element according to the embodiment of the present invention comprises:

a light guide element including a light guide plate, an incidence diffraction element, and an emission diffraction element, the incidence diffraction element being disposed on a main surface of the light guide plate and the emission diffraction element being disposed on the main surface of the light guide plate; and a positive lens that is disposed at a position overlapping the emission diffraction element in a view from a direction perpendicular to the main surface of the light guide plate, in which the incidence diffraction element diffracts incident light such that the diffracted light is incident into the light guide plate, the emission diffraction element emits light propagating in the light guide plate from the light guide plate, and the positive lens collects the light that is emitted from the light guide plate by the emission diffraction element.

[Image Display Apparatus]

The image display apparatus according to the embodiment of the present invention comprises:

the above-described optical element; and a display element that emits an image to the incidence diffraction element of the optical element.

Hereinafter, the image display apparatus according to the embodiment of the present invention including the optical element according to the embodiment of the present invention will be described using the drawings.

Figure 1:
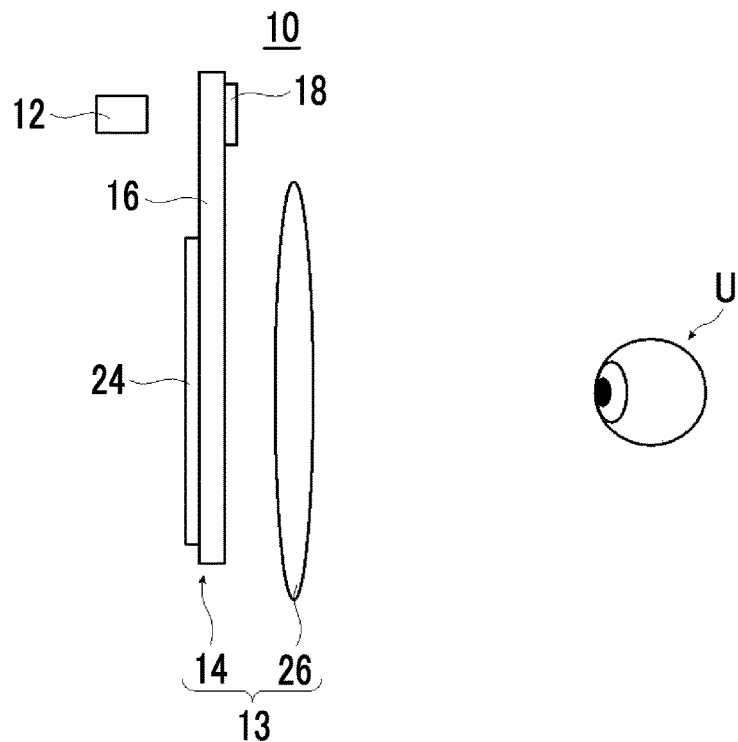
FIG. 1 is a cross-sectional view schematically showing an example of an image display apparatus including an optical element according to the present invention.

FIG. 1 conceptually shows an example of the image display apparatus according to the embodiment of the present invention including the optical element according to the embodiment of the present invention.

An image display apparatus 10 shown in FIG. 1 includes a display element 12 and an optical element 13, and the optical element 13 includes: a light guide element 14 that includes a light guide plate 16, an incidence diffraction element 18, and an emission diffraction element 24; and a positive lens 26. Each of the incidence diffraction element 18 and the emission diffraction element 24 is disposed on a main surface of the light guide plate 16.

In the image display apparatus 10 shown in FIG. 1, the incidence diffraction element 18 and the emission diffraction element 24 are disposed at different positions in a plane direction of the main surface of the light guide plate 16. In addition, in the example shown in FIG. 1, the incidence diffraction element 18 is disposed on one main surface of the light guide plate 16, and the emission diffraction element 24 is disposed on a main surface (another main surface) of the light guide plate 16 opposite to that where the incidence diffraction element 18 is disposed. The main surface is the maximum surface of a sheet-shaped material (for example, a plate-shaped material or a film).

In addition, in the example shown in FIG. 1, each of the incidence diffraction element 18 and the emission diffraction element 24 is a reflective diffraction element that reflects incident light in a direction different from a specular reflection direction.

In the image display apparatus 10, the positive lens 26 is disposed at a position overlapping the emission diffraction element 24 in a view from a direction perpendicular to the main surface of the light guide plate 16. In the example shown in FIG. 1, the positive lens 26 is disposed on a main surface side of the light guide plate 16 opposite to the main surface side where the emission diffraction element 24 is disposed.

In addition, in the image display apparatus 10, the display element 12 is disposed at a position overlapping the incidence diffraction element 18 in a view from a direction perpendicular to the main surface of the light guide plate 16. In the example shown in FIG. 1, the display element 12 is disposed on a main surface side of the light guide plate 16 opposite to the main surface side where the incidence diffraction element 18 is disposed.

In the image display apparatus 10, the display element 12 emits an image (light corresponding to the image) toward the incidence diffraction element 18. The incidence diffraction element 18 diffracts incident light at an angle where total reflection occurs in the light guide plate 16 such that the diffracted light is incident into the light guide plate 16. In this case, the incidence diffraction element 18 diffracts the light in a direction in which a traveling direction of the diffracted light is directed to the emission diffraction element 24. In the example shown in FIG. 1, the incidence diffraction element 18 diffracts the incident light in the lower direction in FIG. 1.

The diffracted light by the incidence diffraction element 18 is totally reflected and propagates in the light guide plate 16 such that the diffracted light is incident into the emission diffraction element 24. The emission diffraction element 24 diffracts the incident light to deviate from the angle at which total reflection occurs in the light guide plate 16. In the example shown in FIG. 1, the emission diffraction element 24 diffracts the incident light to the right direction in FIG. 1. That is, as shown in FIG. 1, the emission diffraction element 24 diffracts the incident light in a direction substantially perpendicular to the main surface of the light guide plate.

Here, in a case where light is diffracted by the emission diffraction element 24, a part of the light is diffracted at a plurality of positions of the emission diffraction element 24 such that exit pupil is expanded.

The light diffracted by the emission diffraction element 24 is emitted from the light guide plate 16 to be incident into the positive lens 26. Here, the emission diffraction element 24 expands exit pupil. Therefore, light is incident into the positive lens from a plurality of different positions of the emission diffraction element 24. The positive lens 26 collects the light incident from different positions and focuses the collected light in the air. The light that is focused in the air is observed as an aerial image by the user U.

The image formation by the positive lens 26 will be described in detail using FIGS. 2 to 4.

As described above, in a case where light is diffracted by the emission diffraction element 24, a part of the light is diffracted at a plurality of positions of the emission diffraction element 24 such that exit pupil is expanded. Therefore, as shown in FIG. 2, light components of points of the image emitted from the display element 12 are diffracted at a plurality of different positions of the emission diffraction element 24. In this case, the light components emitted from the display element 12 at a certain angle are emitted from the light guide plate 16 as parallel light components from a plurality of positions of the emission diffraction element 24.

In a case where the parallel light is incident into the positive lens 26, the light is focused on an imaging point K1 on a focal plane H1 spaced from the positive lens 26 by a focal length fp.

Figure 2:
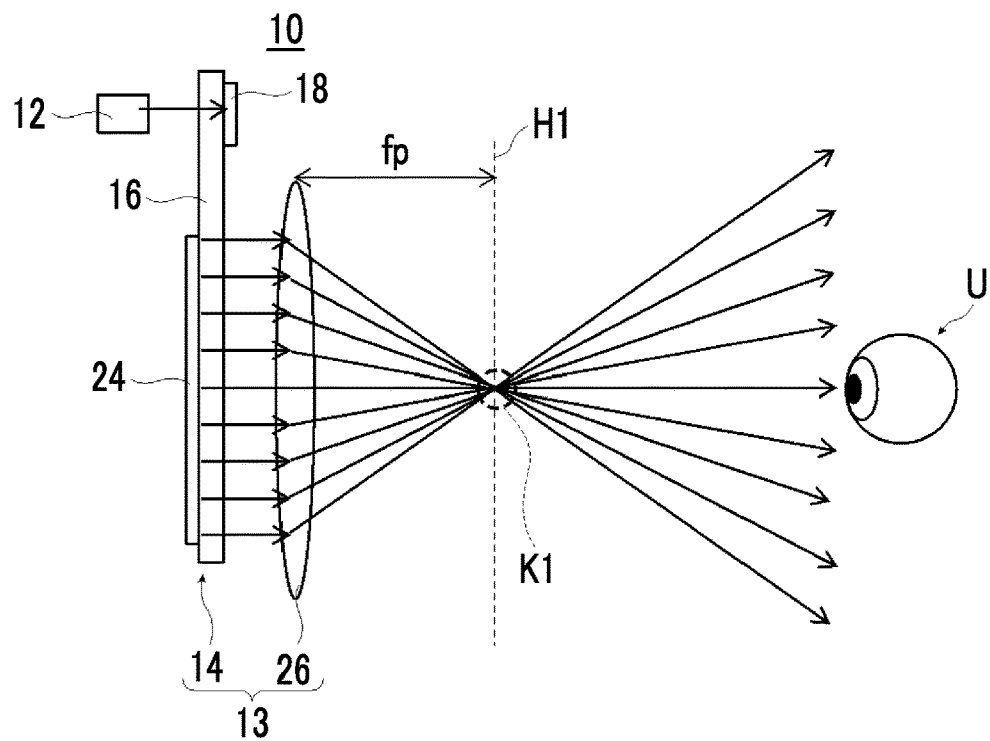
FIG. 2 is a cross-sectional view showing an action of the image display apparatus shown in FIG. 1.
Figure 3:
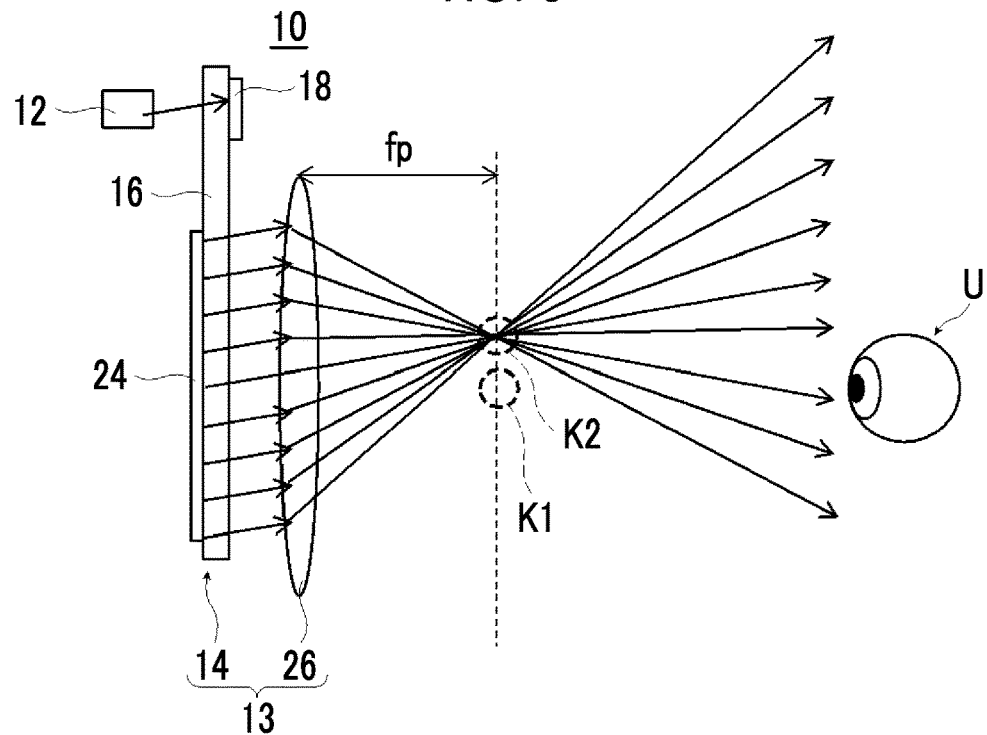
FIG. 3 is a cross-sectional view showing the action of the image display apparatus shown in FIG. 1.

In addition, as shown in FIG. 3, in a case where light components emitted from the display element 12 at angles different from those of FIG. 2 are diffracted by the emission diffraction element 24 to be emitted from the light guide plate 16, emission angles are different from those in the example of FIG. 2. The light components are diffracted at a plurality of different positions of the emission diffraction element 24 and are emitted from the light guide plate 16 as parallel light components from a plurality of positions of the emission diffraction element 24.

In a case where the parallel light is incident into the positive lens 26, the light is focused on an imaging point K2 different from the imaging point K1 on the focal plane H1.

Figure 4:
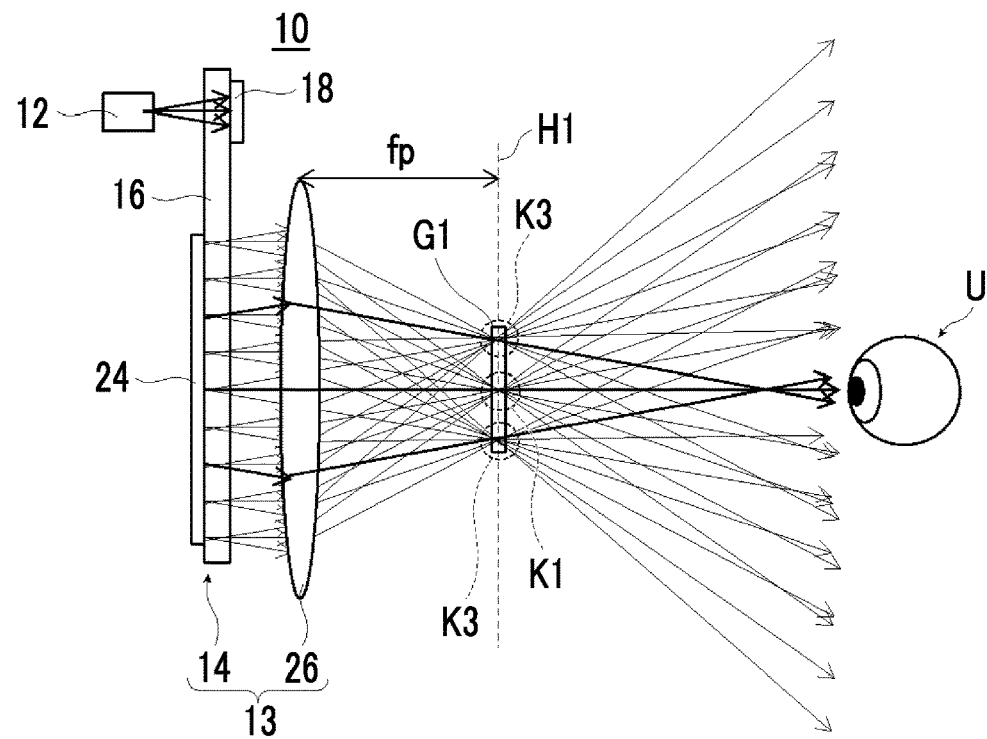
FIG. 4 is a cross-sectional view showing the action of the image display apparatus shown in FIG. 1.

Since light components are emitted from the display element 12 at various angles, as shown in FIG. 4, the light components are incident into the positive lens 26 as parallel light components at the respective angles where the light components are emitted from the display element 12. Therefore, the positive lens 26 focuses each of the parallel light components on each of imaging points (in FIG. 4, K1 to K3) on the focal plane H1.

The plurality of imaging points are formed in a planar shape such that the image emitted from the display element 12 is formed as an aerial image G1. Accordingly, the image display apparatus 10 can display the aerial image G1 to the user U.

As described above, in an image display apparatus in the related art that displays an aerial image, it is necessary to dispose members such as a display element or a reflective plane-symmetric imaging element (reflector array) in a state where the members are tilted relative to each other. Thus, there is a problem in that the total volume of the image display apparatus increases.

On the other hand, in the image display apparatus according to the embodiment of the present invention, as described above, the respective members including the display element 12, the light guide plate 16, the incidence diffraction element 18, the emission diffraction element 24, and the positive lens 26 can be disposed substantially parallel to each other. Therefore, a relative tilt between the display element and a member such as a retroreflection element is not limited. Therefore, the total thickness of the image display apparatus can be reduced, and the volume can be reduced.

In addition, as described above, in the image display apparatus in the related art, the reflective plane-symmetric imaging element (reflector array) is present behind the aerial image. Therefore, the scenery behind the reflective plane-symmetric imaging element (reflector array) cannot be recognized, and there is a problem in that AR display of displaying the scenery and the aerial image to be superimposed on each other cannot be performed.

On the other hand, the image display apparatus according to the embodiment of the present invention can be configured such that the positive lens and the light guide plate are transparent in a visible range and at least a part of light in a visible range can transmit through the emission diffraction element. Therefore, the user U can recognize the behind scenery. Accordingly, the image display apparatus according to the embodiment of the present invention can perform AR display of displaying the scenery and the aerial image to be superimposed on each other.

As shown in FIG. 1, it is preferable that the size of the positive lens 26 in a plane direction of the main surface of the light guide plate 16 (hereinafter, also simply referred to as "plane direction") is more than that of the emission diffraction element 24 and the positive lens 26 is disposed to include the emission diffraction element 24 in the plane direction. However, the present invention is not limited to this configuration, and at least a part of the positive lens 26 may overlap the emission diffraction element 24 in the plane direction. For example, the size of the positive lens may be less than that of the emission diffraction element, and the positive lens may be disposed to cover a part of the emission diffraction element in the plane direction. Alternatively, the size of the positive lens may be more than that of the emission diffraction element, and the positive lens may be disposed to cover a part of the emission diffraction element in the plane direction.

Here, in the example shown in FIG. 1, the incidence diffraction element 18 and the emission diffraction element 24 are disposed on the different main surfaces of the light guide plate 16, but the present invention is not limited thereto. The incidence diffraction element 18 and the emission diffraction element 24 may be disposed on the same main surface of the light guide plate 16. In a case where the incidence diffraction element 18 and the emission diffraction element 24 are disposed on the same main surface of the light guide plate 16, the display element 12 and the positive lens 26 are disposed to face each other on the same main surface of the light guide plate 16.

In addition, another layer may be provided between the incidence diffraction element 18 and the display element 12. For example, in a case where the incidence diffraction element 18 has circularly polarized light selectivity, a layer that converts incident light into circularly polarized light may be provided between the incidence diffraction element 18 and the display element 12.

For example, in a case where the display element 12 emits linearly polarized light or in a case where a linearly polarizing plate is provided on a display surface side of the display element 12, a λ/4 plate may be provided between the incidence diffraction element 18 and the light guide plate 16. Linearly polarized light that is emitted from the display element 12 (or that is converted by the linearly polarizing plate) is converted into circularly polarized light by the λ/4 plate to be incident into the incidence diffraction element 18. The λ/4 plate is disposed such that the linearly polarized light emitted from the display element 12 is converted into circularly polarized light in a turning direction in which the linearly polarized light is reflected by the incidence diffraction element 18.

The incidence diffraction element and the emission diffraction element are not limited to the configuration in which they have circularly polarized light selectivity. Light guided in the light guide plate may be linearly polarized light, and the incidence diffraction element and the emission diffraction element may have linearly polarized light selectivity.

In addition, in the example shown in FIG. 1, the reflective diffraction element that diffracts and reflects incident light is used as the incidence diffraction element 18. However, the present invention is not limited to this configuration. As the incidence diffraction element, a transmission type diffraction element that diffracts incident light and allows transmission thereof may be used.

Likewise, in the example shown in FIG. 1, the reflective diffraction element that diffracts and reflects incident light is used as the emission diffraction element 24. However, the present invention is not limited to this configuration. As the emission diffraction element, a transmission type diffraction element that diffracts incident light and allows transmission thereof may be used.

Figure 5:
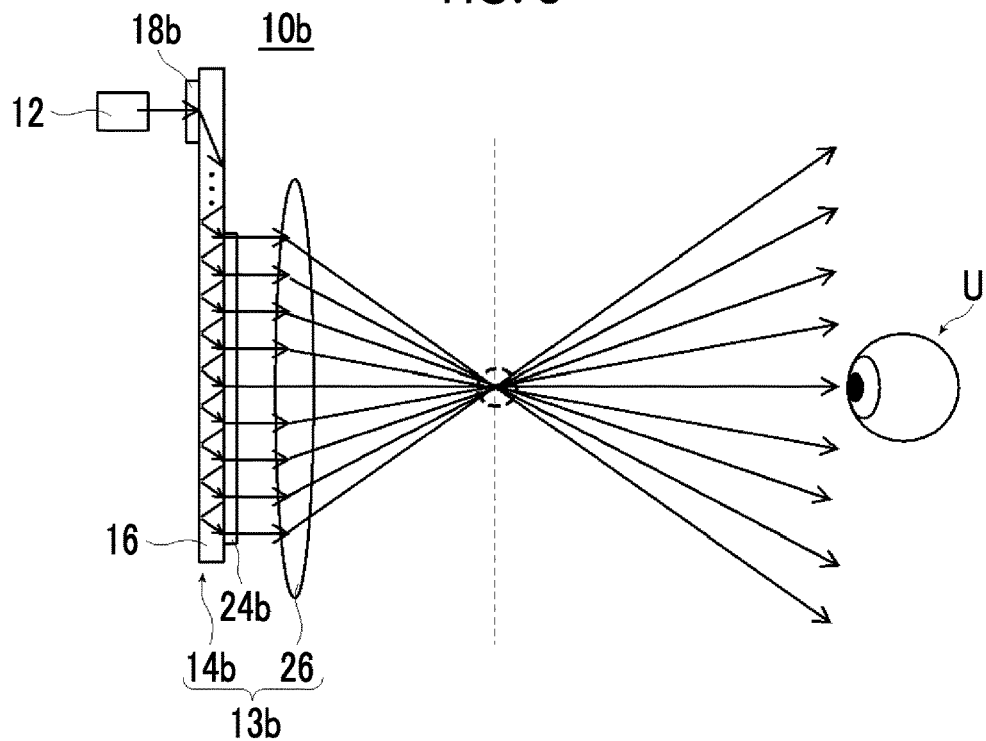
FIG. 5 is a cross-sectional view schematically showing an image display apparatus including another example of the optical element according to the present invention.

For example, an image display apparatus 10*b* shown in FIG. 5 includes the display element 12 and an optical element 13*b*, and the optical element 13*b* includes: a light guide element 14*b* that includes the light guide plate 16, an incidence diffraction element 18*b*, and an emission diffraction element 24*b*; and the positive lens 26.

In addition, in the example shown in FIG. 5, each of the incidence diffraction element 18*b* and the emission diffraction element 24*b* is a transmission type diffraction element that diffracts incident light and allows transmission thereof.

In the image display apparatus 10*b* shown in FIG. 5, the incidence diffraction element 18 and the emission diffraction element 24 are disposed at different positions in the plane direction of the main surface of the light guide plate 16. In addition, in the example shown in FIG. 5, the incidence diffraction element 18*b* is disposed on a main surface of the light guide plate 16 facing the display element 12. In addition, the emission diffraction element 24*b* is disposed on a main surface of the light guide plate 16 facing the positive lens 26.

In the image display apparatus 10*b*, the display element 12 emits an image (light corresponding to the image) toward the incidence diffraction element 18*b*. The incidence diffraction element 18 allows transmission of incident light and diffracts the incident light at an angle where total reflection occurs in the light guide plate 16 such that the diffracted light is incident into the light guide plate 16. In this case, the incidence diffraction element 18 diffracts the light in a direction in which a traveling direction of the diffracted light is directed to the emission diffraction element 24.

The diffracted light by the incidence diffraction element 18*b* is totally reflected and propagates in the light guide plate 16 such that the diffracted light is incident into the emission diffraction element 24*b*. The emission diffraction element 24*b* diffracts the incident light to deviate from the angle at which total reflection occurs in the light guide plate 16. Here, in a case where light is diffracted by the emission diffraction element 24*b*, a part of the light is diffracted at a plurality of positions of the emission diffraction element 24*b* such that exit pupil is expanded.

The light diffracted by the emission diffraction element 24*b* is emitted from the light guide plate 16 to be incident into the positive lens 26. The emission diffraction element 24*b* expands exit pupil. Therefore, light is incident into the positive lens from a plurality of different positions of the emission diffraction element 24. The positive lens 26 collects the light incident from different positions and focuses the collected light in the air. As a result, the image display apparatus 10*b* forms (displays) an aerial image.

Here, the image display apparatus 10 includes the positive lens 26. Therefore, background light arrives at the user U through the positive lens 26. In this case, the background image recognized by the user U may be distorted by the positive lens 26.

Figure 6:
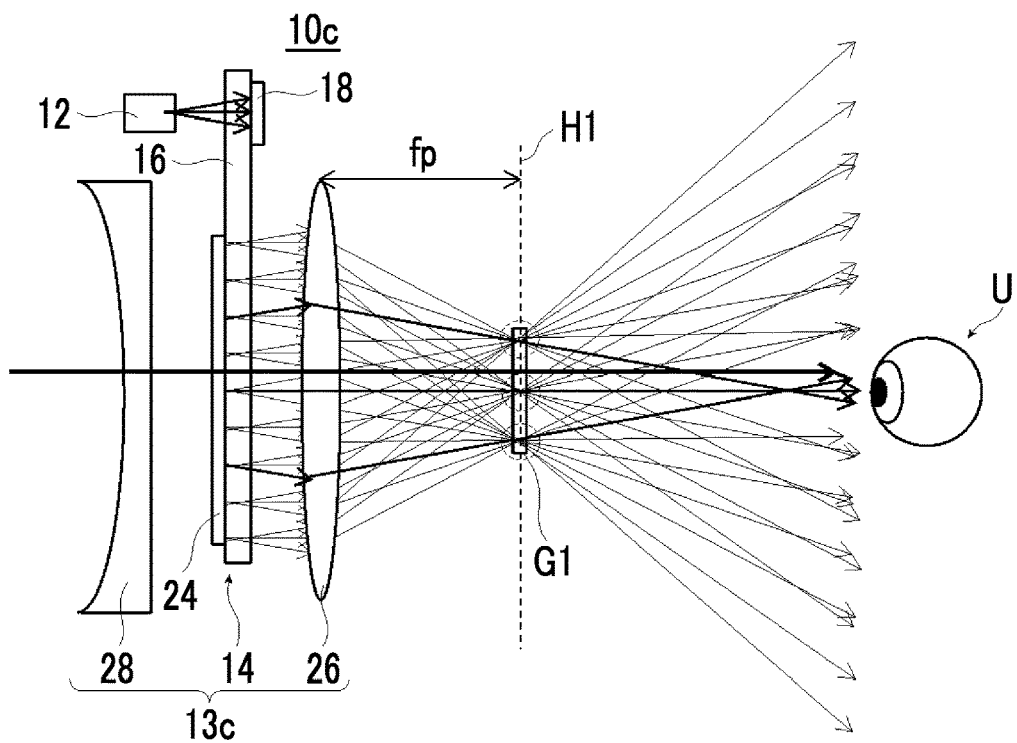
FIG. 6 is a cross-sectional view schematically showing an image display apparatus including another example of the optical element according to the present invention.

Therefore, as in the image display apparatus 10*c* shown in FIG. 6, it is preferable that an optical element 13*c* includes a negative lens 28 that is disposed on a side of the light guide element 14 opposite to the positive lens 26. By disposing the negative lens 28, the distortion of the background image by the positive lens 26 can be corrected by the negative lens 28, and the distortion of the background image recognized by the user U can be reduced.

Here, it is preferable that the positive lens 26 and the light guide element 14 are spaced from each other as shown in FIGS. 1 and 5. Likewise, it is preferable that the negative lens 28 and the light guide element 14 are spaced from each other as shown in FIG. 6. As described above, the emission diffraction element 24 diffracts a part of light at a plurality of positions such that exit pupil is expanded. Therefore, a part of the light is totally reflected without being diffracted and is guided in the light guide plate 16. In this case, in a case where the positive lens 26 and the light guide element 14 are adjacent to each other, a part of the light that is guided in the light guide plate 16 without being diffracted by the emission diffraction element 24 may be incident into the positive lens 26 or the negative lens 28 without being reflected from an interface with the positive lens 26 or the negative lens 28. In a case where light is incident into the positive lens 26 or the negative lens 28, the path of the light changes. Therefore, subsequently, in a case where the light is emitted, there may be a problem in that, for example, the light cannot be appropriately focused by the positive lens 26 without being converted into parallel light. Accordingly, it is preferable that the positive lens 26 and the negative lens 28 and the light guide element 14 are spaced from each other.

From the viewpoint of suppressing the distortion of the background image by the positive lens, it is preferable that the focal length of the positive lens and the focal length of the negative lens are close to each other. Specifically, in a case where a focal length of the positive lens is represented by +fp and a focal length of the negative lens is represented by −fn, a ratio fn/fp between fp and fn satisfies preferably $0.7 \leq fn/fp \leq 1.3$, more preferably $0.8 \leq fn/fp \leq 1.2$, and still more preferably $0.9 \leq fn/fp \leq 1.1$.

In addition, it is preferable that the size of the positive lens in the plane direction is substantially the same as the size of the negative lens.

In addition, it is preferable that the positive lens is a focus tunable lens in which the focal length can change. By changing the focal length of the positive lens, the distance from the image display apparatus to the position (focal plane) where the aerial image is displayed can change. In addition, in a case where the positive lens is a focus tunable lens, it is preferable that the negative lens is a focus tunable lens and the focal length of the negative lens is adjusted according to the focal length of the positive lens.

As the focus tunable lens, a lens that is formed of a medium where optical characteristics such as a refractive index change in a case where a voltage is applied can be used. This lens can change the focal length by applying a voltage to change a refractive index distribution in the medium.

In addition, the optical element according to the embodiment of the present invention includes an intermediate diffraction element disposed on the main surface of the light guide plate. The intermediate diffraction element diffracts the light that is diffracted by the incidence diffraction element to be incident into the light guide plate and propagates in the light guide plate toward the emission diffraction element.

Figure 7:
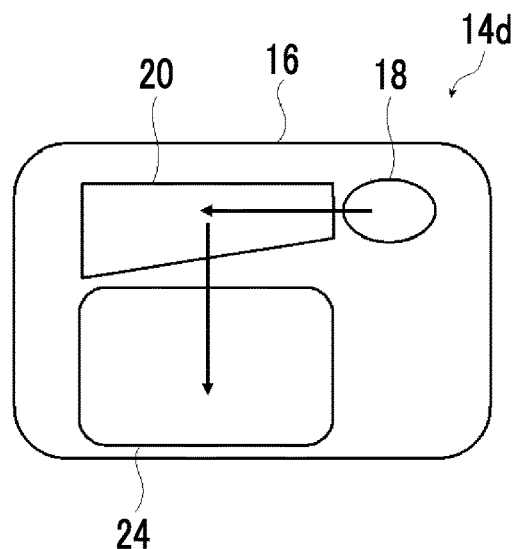
FIG. 7 is a front view schematically showing another example of the optical element according to the present invention.

For example, a light guide element 14d shown in FIG. 7 includes the light guide plate 16, the incidence diffraction element 18, an intermediate diffraction element 20, and the emission diffraction element 24.

In the light guide element 14d shown in FIG. 7, the incidence diffraction element 18, the intermediate diffraction element 20, and the emission diffraction element 24 are disposed at different positions in the plane direction of the main surface of the light guide plate 16. In the example shown in FIG. 7, the intermediate diffraction element 20 is disposed on the left side of the incidence diffraction element 18 in FIG. 1, and the emission diffraction element 24 is disposed on the lower side of the intermediate diffraction element 20 in FIG. 1.

In an image display apparatus including the light guide element 14d, in a case where the incidence diffraction element 18 diffracts incident light emitted from the display element, the light is diffracted in a direction in which a traveling direction of the diffracted light is directed to the intermediate diffraction element 20. In the example shown in FIG. 7, the incidence diffraction element 18 diffracts the incident light in the left direction in FIG. 7.

The diffracted light by the incidence diffraction element 18 is totally reflected and propagates in the light guide plate 16 such that the diffracted light is incident into the intermediate diffraction element 20. The intermediate diffraction element 20 diffracts the incident light such that the traveling direction of the light is directed to the emission diffraction element 24. In the example shown in FIG. 7, the intermediate diffraction element 20 diffracts the incident light in the lower direction in FIG. 7.

The light diffracted by the intermediate diffraction element 20 is totally reflected and propagates in the light guide plate 16 to be incident into emission diffraction element 24. The emission diffraction element 24 diffracts the incident light to deviate from the angle at which total reflection occurs in the light guide plate 16. The light diffracted by the emission diffraction element 24 is emitted from the light guide plate 16 to be incident into the positive lens (not shown) and is focused in the air.

Here, with the configuration including the intermediate diffraction element 20, in a case where light is diffracted by the intermediate diffraction element 20, a part of the light is diffracted at a plurality of positions of the intermediate diffraction element such that exit pupil can be expanded. That is, with the configuration including the intermediate diffraction element 20, each of the intermediate diffraction element 20 and the emission diffraction element 24 can expand exit pupil. In the example of FIG. 7, exit pupil is expanded in the left-right direction by the intermediate diffraction element 20 such that exit pupil can be expanded in the up-down direction by the emission diffraction element 24.

Hereinafter, each of the components in the image display apparatus according to the embodiment of the present invention will be described.

[Display Element]

The display element 12 emits an image (a static image or a moving image) that is projected in the air.

The display element 12 is not particularly limited. For example, various well-known displays used in an image display apparatus can be used.

In the image display apparatus 10 according to the embodiment of the present invention, as the display element 12, various well-known display elements (a display device or a projector) used for various image display apparatuses can be used without any particular limitation. Examples of the display element 12 include a display element including a display and a projection lens.

In the image display apparatus 10 according to the embodiment of the present invention, the display is not particularly limited. For example, various well-known displays used for various image display apparatuses can be used.

Examples of the display include a liquid crystal display (LCOS including Liquid Crystal On Silicon), an organic electroluminescent display, and a scanning type display employing a digital light processing (DLP) or Micro Electro Mechanical Systems (MEMS) mirror.

In a case where each of diffraction elements in a display includes a plurality of liquid crystal layers having different selective reflection wavelengths, a display that displays a polychromic image using light having a wavelength reflected from each of the liquid crystal layers is used.

In the display element 12 used in the image display apparatus 10 according to the embodiment of the present invention, the projection lens is also a well-known projection lens (collimating lens) used for various image display apparatuses.

Here, in the image display apparatus 10 according to the embodiment of the present invention, a display image by the display element 12, that is, light to be emitted from the display element 12 is not limited and is preferably polarized light, in particular, circularly polarized light.

In a case where the display element 12 emits circularly polarized light and the display emits an unpolarized light image, and it is preferable that the display element 12 includes, for example, a circular polarization plate including a linear polarizer and an λ/4 plate. In addition, in a case where the display emits a linearly polarized light image, it is preferable that the display element 12 includes, for example, a λ/4 plate.

The light to be emitted by the display element 12 may be, for example, another polarized light (for example, linearly polarized light).

[Light Guide Plate]

The light guide plate 16 guides incident light into the inside.

The light guide plate 16 is not particularly limited, and a well-known light guide plate of the related art that is used for image display apparatuses or the like can be used.

The thickness of the light guide plate 16 is not particularly limited and, from the viewpoint of reducing the total volume of the image display apparatus, is preferably 0.01 mm to 500 mm, more preferably 0.05 mm to 100 mm, and still more preferably 0.1 mm to 10 mm.

In addition, the size of the main surface of the light guide plate 16 is not particularly limited and may be appropriately set depending on the size of the aerial image G1 displayed by the image display apparatus, the size of the display surface of the display element 12, and the like.

[Diffraction Element]

As the incidence diffraction element 18, the intermediate diffraction element 20, and the emission diffraction element 24, well-known diffraction elements in the related art can be appropriately used. Therefore, the incidence diffraction element 18, the intermediate diffraction element 20, and the emission diffraction element 24 will also be referred to as "diffraction element" unless it is necessary to distinguish between the diffraction elements.

It is preferable that each of the diffraction elements is any one of a surface relief type diffraction element, a volume hologram type diffraction element, or a polarization diffraction element.

It is preferable that the polarization diffraction element is a liquid crystal diffraction element that is formed of a composition including a liquid crystal compound. In addition, it is also preferable that the liquid crystal diffraction element includes a cholesteric liquid crystal layer obtained by immobilizing a cholesteric liquid crystalline phase. In addition, the diffraction element may be a transmission type diffraction element or a reflective diffraction element.

Hereinafter, the configuration of each of the diffraction elements will be described.

[Surface Relief Type Diffraction Element]

As the surface relief type diffraction element, a well-known surface relief type diffraction element can be used. As in D1 shown in FIG. 8 as an example, the surface relief type diffraction element is configured such that linear fine protrusions and recesses are alternately arranged on the surface in parallel at predetermined periods. The period of the diffraction structure, the material thereof, the height of the convex portion, and the like may be appropriately set depending on the wavelength range where light is diffracted.

In addition, in the surface relief type diffraction element, the diffraction structure (uneven structure) may be formed on the surface of a film-like material formed of a resin, or the diffraction structure (uneven structure) may be formed directly on the surface of the light guide plate.

Figure 8:
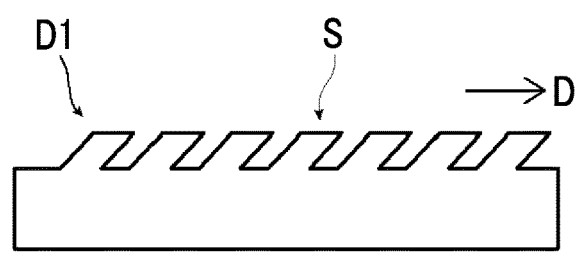
FIG. 8 is a cross-sectional view conceptually showing a surface relief type diffraction element.

In the surface relief type diffraction element, the uneven structure formed on the surface is the diffraction structure, the period of the uneven structure is the period of the diffraction structure, and the arrangement direction of the uneven structure indicated by arrow D in FIG. 8 is the periodic direction of the diffraction structure.

[Volume Hologram Type Diffraction Element]

As the volume hologram type diffraction element, a well-known volume hologram type diffraction element can be used. As in D2 shown in FIG. 9 as an example, the volume hologram type diffraction element is configured such that a linear region 110 having a high refractive index and a linear region 112 having a low refractive index are alternately arranged in parallel at predetermined periods. The period of the diffraction structure, the material thereof, the refractive index of each of the regions, and the like may be appropriately set depending on the wavelength range where light is diffracted.

Figure 9:
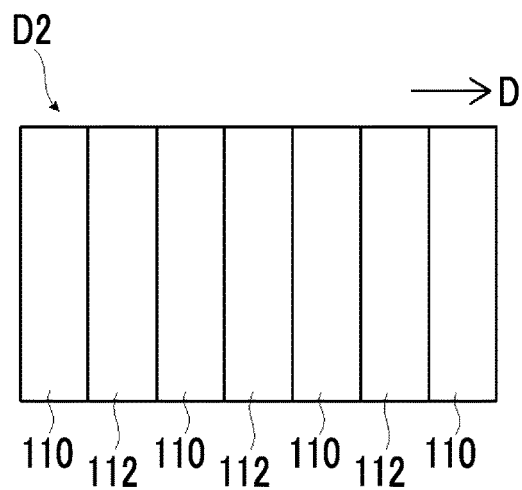
FIG. 9 is a front view conceptually showing a volume hologram type diffraction element.

In the volume hologram type diffraction element, the structure in which the linear region 110 having a high refractive index and the linear region 112 having a low refractive index are alternately formed is the diffraction structure, the period of the arrangement of the region 110 and the region 112 is the period of the diffraction structure, and the arrangement direction of the region 110 and the region 112 indicated by arrow D in FIG. 9 is the periodic direction of the diffraction structure.

[Polarization Diffraction Element]

As the polarization diffraction element, a well-known polarization diffraction element can be used. The polarization diffraction element is a diffraction element that controls a diffraction direction or a polarization state of emitted light and a diffracted light intensity depending on the polarization state of incident light by controlling the polarization state in a fine region. Examples of the polarization diffraction element include a polarization diffraction element in which a diffraction structure is formed using structural birefringence described in Erez Hasman et al., Polarization dependent focusing lens by use of quantized Pancharatnm-Berry phase diffractive optics, Applied Physics Letters, Volume 82, Number 3, pp. 328-330 and a polarization diffraction element in which a diffraction structure is formed using a birefringence material described in JP5276847B.

Examples of the polarization diffraction element include a liquid crystal diffraction element including a liquid crystal layer that is formed using a composition including a liquid crystal compound and has a liquid crystal alignment pattern in which a direction of an optical axis derived from the liquid crystal compound changes while continuously rotating in at least one in-plane direction.

(Reflective Liquid Crystal Diffraction Element)

An example of the reflective liquid crystal diffraction element will be described using FIGS. 10 and 11.

Figure 10:
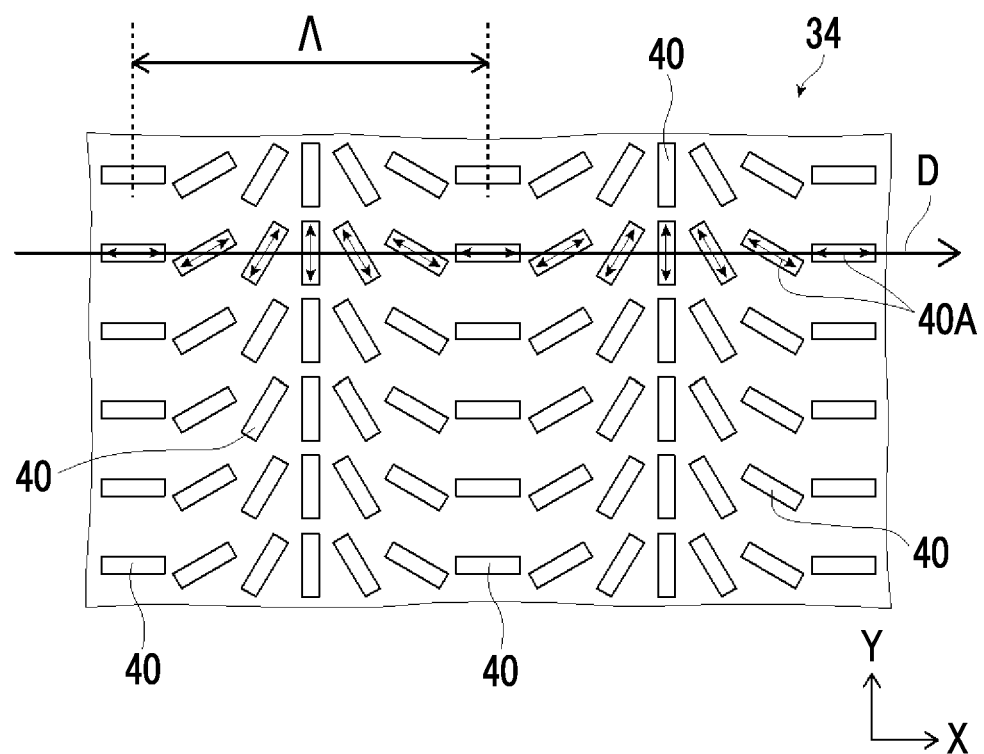
FIG. 10 is a plan view conceptually showing a cholesteric liquid crystal layer in a reflective liquid crystal diffraction element.

FIG. 10 is a plan view showing a cholesteric liquid crystal layer in a reflective liquid crystal diffraction element. FIG. 11 is a diagram schematically showing an example of the reflective liquid crystal diffraction element.

Figure 11:
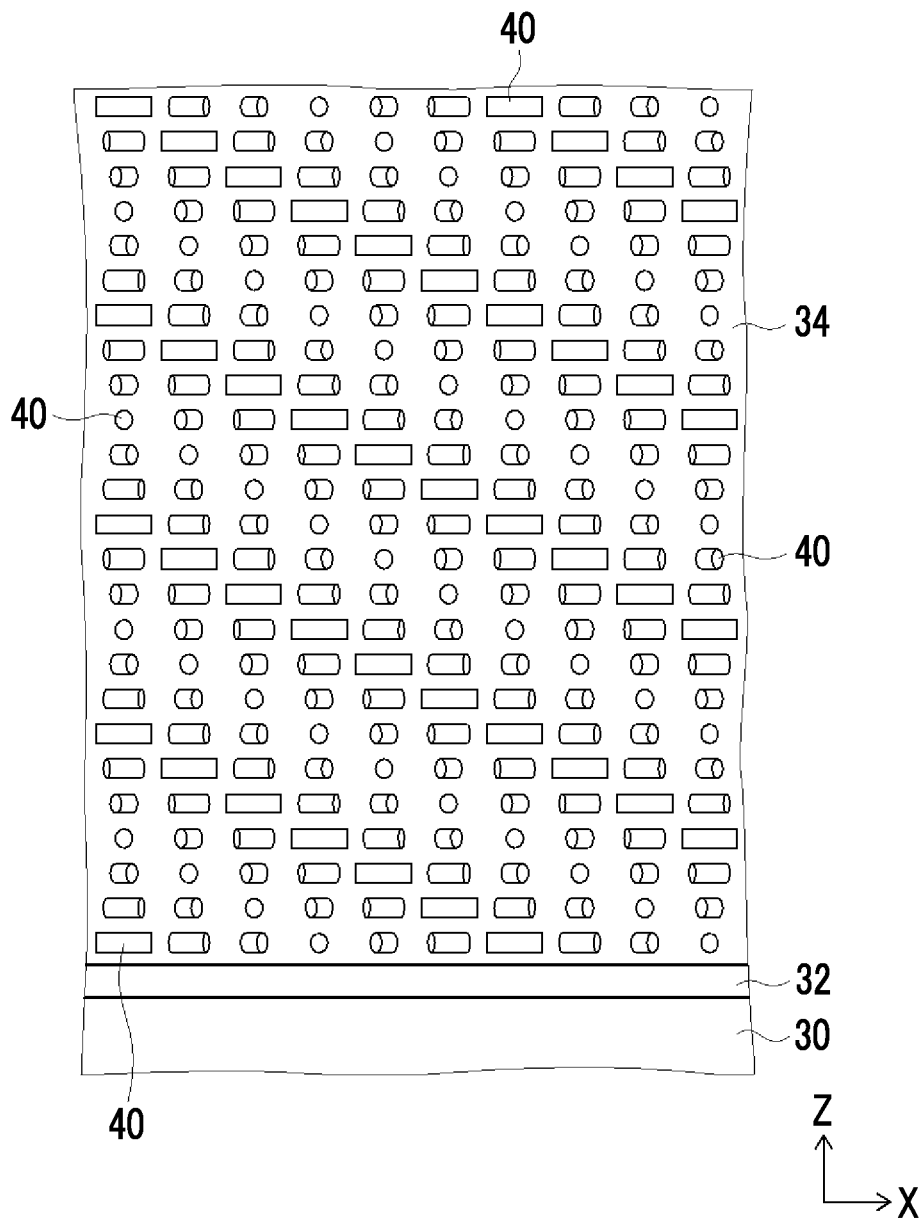
FIG. 11 is a cross-sectional view conceptually showing the cholesteric liquid crystal layer shown in FIG. 10.

The reflective liquid crystal diffraction element shown in FIGS. 10 and 11 includes a cholesteric liquid crystal layer 34 that is obtained by immobilizing a cholesteric liquid crystalline phase and has a liquid crystal alignment pattern in which a direction of an optical axis derived from a liquid crystal compound changes while continuously rotating in at least one in-plane direction. The cholesteric liquid crystal layer reflects one circularly polarized light having a selective reflection wavelength, and allows transmission of light in other wavelength ranges and other circularly polarized light. Accordingly, the diffraction element including the cholesteric liquid crystal layer is a reflective diffraction element.

In the example shown in FIG. 11, the reflective liquid crystal diffraction element includes a support 30, an alignment film 32, and the cholesteric liquid crystal layer 34.

In the example shown in FIG. 11, the reflective liquid crystal diffraction element includes the support 30, the alignment film 32, and the cholesteric liquid crystal layer 34. However, the present invention is not limited to this configuration. For example, the reflective liquid crystal diffraction element may include only the alignment film 32 and the cholesteric liquid crystal layer 34 by peeling off the support 30 after bonding the laminate to the light guide plate 16. Alternatively, the reflective liquid crystal diffraction element may include only the cholesteric liquid crystal layer 34 by peeling off the support 30 and the alignment film 32 after bonding the laminate to the light guide plate 16.

<Support>

The support 30 supports the alignment film 32 and the cholesteric liquid crystal layer 34.

As the support 30, various sheet-shaped materials (films or plate-shaped materials) can be used as long as they can support the alignment film 32 and the cholesteric liquid crystal layer 34.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the reflective liquid crystal diffraction element, a material for forming the support 30, and the like in a range where the alignment film 32 and the cholesteric liquid crystal layer 34 can be supported.

The thickness of the support 30 is preferably 1 to 2000 µm, more preferably 3 to 500 µm, and still more preferably 5 to 250 µm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

<Alignment Film>

In the reflective liquid crystal diffraction element, the alignment film 32 is formed on a surface of the support 30.

The alignment film 32 is an alignment film for aligning the liquid crystal compound 40 to a predetermined liquid crystal alignment pattern during the formation of the cholesteric liquid crystal layer 34.

Although described below, in the present invention, the cholesteric liquid crystal layer 34 has a liquid crystal alignment pattern in which a direction of an optical axis 40A (refer to FIG. 10) derived from the liquid crystal compound 40 changes while continuously rotating in one in-plane direction. Accordingly, the alignment film 32 is formed such that the cholesteric liquid crystal layer 34 can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film 32 such as JP2005-97377A, JP2005-99228A, and JP2005-128503A is preferable.

In the reflective liquid crystal diffraction element, for example, the alignment film 32 can be suitably used as a so-called photo-alignment film obtained by irradiating a photo-alignment material with polarized light or non-polarized light. That is, in the reflective liquid crystal diffraction element, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 µm and more preferably 0.05 to 2 µm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 17:
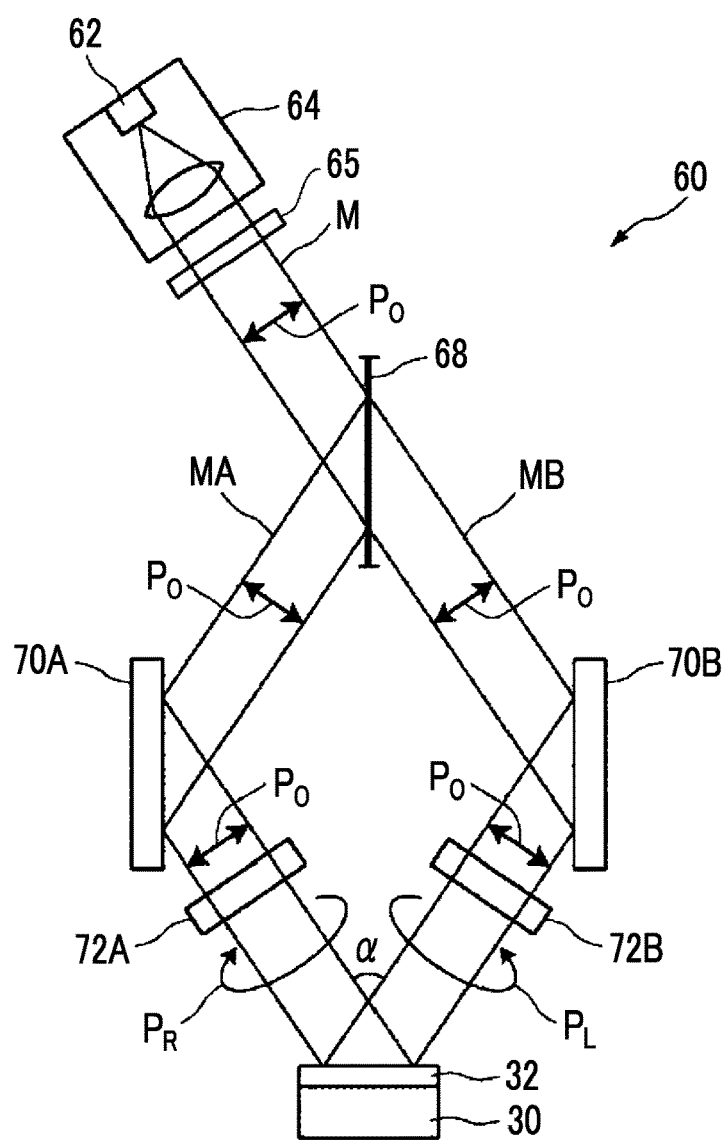
FIG. 17 is a conceptual diagram showing an example of an exposure device that exposes an alignment film.

FIG. 17 conceptually shows an example of an exposure device that exposes the alignment film 32 to form an alignment pattern.

An exposure device 60 shown in FIG. 17 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B, respectively.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere each other on the alignment film 32, and the alignment film 32 is irradiated with and exposed to the interference light.

Due to the interference in this case, the polarization state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 32 having the alignment pattern in which the alignment state periodically changes, as described below, the cholesteric liquid crystal layer 34 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has a liquid crystal alignment pattern in which the liquid crystal compound is aligned such that the direction of the optical axis of the liquid crystal compound in the cholesteric liquid crystal layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, or the like, the cholesteric liquid crystal layer 34 or the like has the liquid crystal alignment pattern in which the direction of the optical axis 40A derived from the liquid crystal compound 40 changes while continuously rotating in at least one in-plane direction. That is, in the present invention, the support 30 may be made to function as the alignment film.

<Cholesteric Liquid Crystal Layer>

In the reflective liquid crystal diffraction element, the cholesteric liquid crystal layer 34 is formed on a surface of the alignment film 32.

As described above, the cholesteric liquid crystal layer is a cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction. In the cholesteric liquid crystal layer having the liquid crystal alignment pattern in which the direction of the optical axis derived from the liquid crystal compound changes while continuously rotating in at least one in-plane direction, an arrangement direction of bright portions and dark portions derived from the cholesteric liquid crystalline phase observed with a SEM in a cross section perpendicular to the main surface of the cholesteric liquid crystal layer is tilted with respect to the main surface of the cholesteric liquid crystal layer.

As conceptually shown in FIG. 11, the cholesteric liquid crystal layer 34 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360) and laminated is set as one helical pitch, and plural pitches of the helically turned liquid crystal compound 40 are laminated.

As is well-known, the cholesteric liquid crystal layer obtained by immobilizing a cholesteric liquid crystalline phase has wavelength-selective reflectivity.

Figure 14:
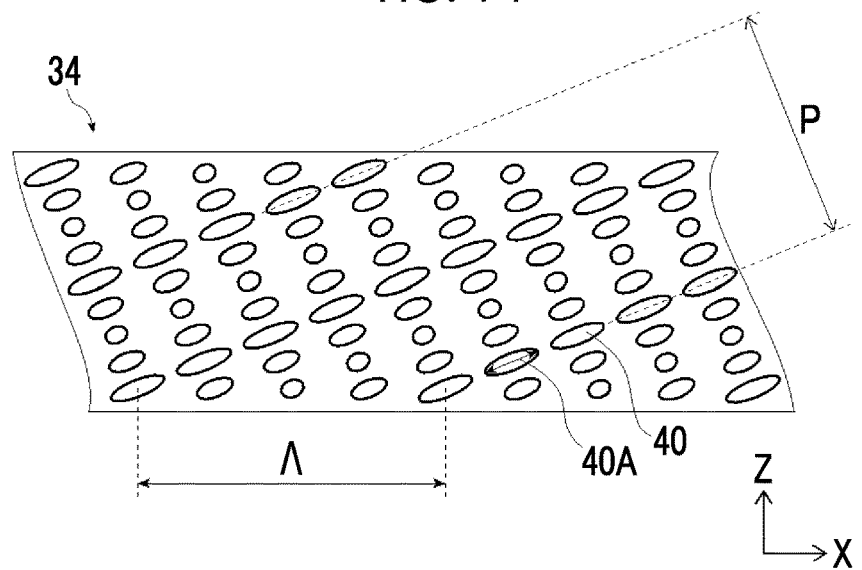
FIG. 14 is a diagram conceptually showing another example of the cholesteric liquid crystal layer used as a liquid crystal diffraction element.

Although described below in detail, the selective reflection wavelength range of the cholesteric liquid crystal layer depends on the length of one helical pitch described above in the thickness direction. In a case where the tilt of the liquid crystal compound matches with the tilt of the bright portions and the dark portion as shown in FIG. 14, the helical pitch substantially matches a tilted surface pitch P shown in FIG. 12. In addition, in a case where the tilt of the liquid crystal compound does not match with the tilt of the bright portions and the dark portion as shown in FIG. 11, the helical pitch slightly deviates from the tilted surface pitch P shown in FIG. 12. However, the following description will be made without distinguishing between the helical pitch and the tilted surface pitch.

Accordingly, in the configuration where wavelength selectivity is imparted to the liquid crystal diffraction element to diffract light having a wavelength that varies depending on each of the diffraction elements, the selective reflection wavelength range of the cholesteric liquid crystal layer may be set by adjusting the helical pitch P of the cholesteric liquid crystal layer according to each of the liquid crystal diffraction elements.

As shown in FIG. 10, in the X-Y plane of the cholesteric liquid crystal layer 34, the liquid crystal compounds 40 are arranged along a plurality of arrangement axes D parallel to the X-Y plane. On each of the arrangement axes D, the direction of the optical axis 40A of the liquid crystal compound 40 changes while continuously rotating in the one in-plane direction along the arrangement axis D. Here, for the convenience of description, it is assumed that the arrangement axis D is directed to the X direction. In addition, in the Y direction, the liquid crystal compounds 40 in which the directions of the optical axes 40A are the same are arranged at regular intervals.

"The direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ−180° along the arrangement axis D. That is, in each of the plurality of liquid crystal compounds 40 arranged along the arrangement axis D, as shown in FIG. 3, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the cholesteric liquid crystal layer 34, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length Λ of the single period in the liquid crystal alignment pattern.

That is, a distance between centers of two liquid crystal compounds 40 in the arrangement axis D direction is the length Λ of the single period, the two liquid crystal compounds having the same angle in the arrangement axis D direction. Specifically, as shown in FIG. 10, a distance between centers in the arrangement axis D direction of two liquid crystal compounds 40 in which the arrangement axis D direction and the direction of the optical axis 40A match each other is the length Λ of the single period. In the following description, the length Λ of the single period will also be referred to as "single period Λ".

In the liquid crystal alignment pattern of the cholesteric liquid crystal layer 34, the single period Λ is repeated in the arrangement axis D direction, that is, in the one in-plane direction in which the direction of the optical axis 40A changes while continuously rotating.

On the other hand, in the liquid crystal compound 40 forming the cholesteric liquid crystal layer 34, the directions of the optical axes 40A are the same in the direction (in FIG. 10, the Y direction) perpendicular to the arrangement axis D direction, that is, the Y direction perpendicular to the one in-plane direction in which the optical axis 40A continuously rotates.

In other words, in the liquid crystal compound 40 forming the cholesteric liquid crystal layer 34, angles between the optical axes 40A of the liquid crystal compound 40 and the arrangement axis D direction are the same in the Y direction.

Figure 12:
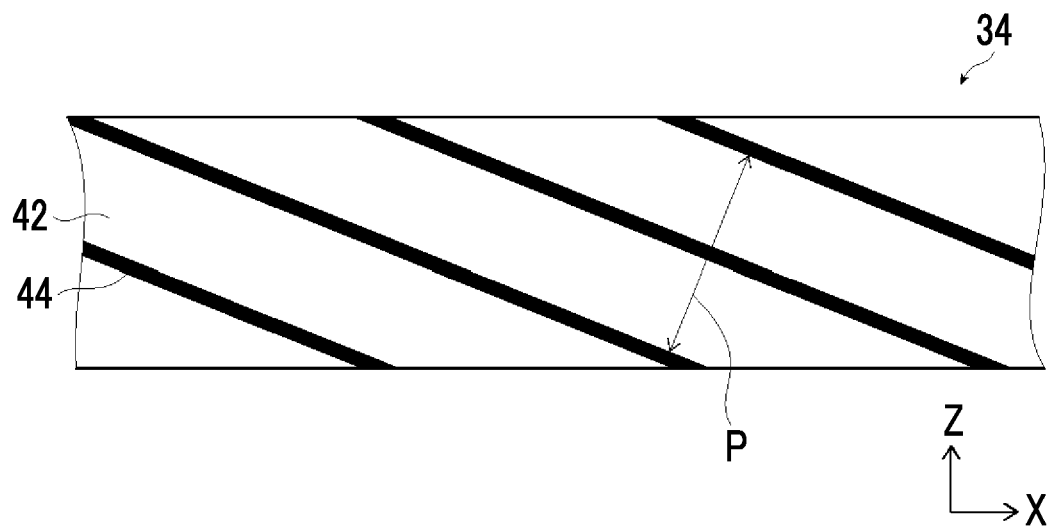
FIG. 12 is a diagram conceptually showing a cross-sectional SEM image of the cholesteric liquid crystal layer shown in FIG. 10.

In a case where the X-Z plane of the cholesteric liquid crystal layer 34 shown in FIG. 11 is observed with a scanning electron microscope (SEM), an arrangement direction in which bright portions 42 and dark portions 44 are alternately arranged as shown in FIG. 12, a stripe pattern tilted at a predetermined angle with respect to the main surface (X-Y plane) is observed. In this SEM cross section, an interval between the bright portions 42 adjacent to each other or between the dark portions 44 adjacent to each other in a normal direction of lines formed by the bright portions 42 or the dark portions 44 corresponds to a ½ pitch.

Hereinafter, an action of diffraction of the liquid crystal layer will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane). Accordingly, in a case where the X-Z plane of the cholesteric liquid crystal layer in the related art is observed with a SEM, an arrangement direction in which bright portions and dark portions are alternately arranged is perpendicular to the main surface (X-Y plane).

The cholesteric liquid crystalline phase has specular reflectivity. Therefore, in a case where light is incident from the normal direction into the cholesteric liquid crystal layer, the light is reflected in the normal direction.

Figure 13:
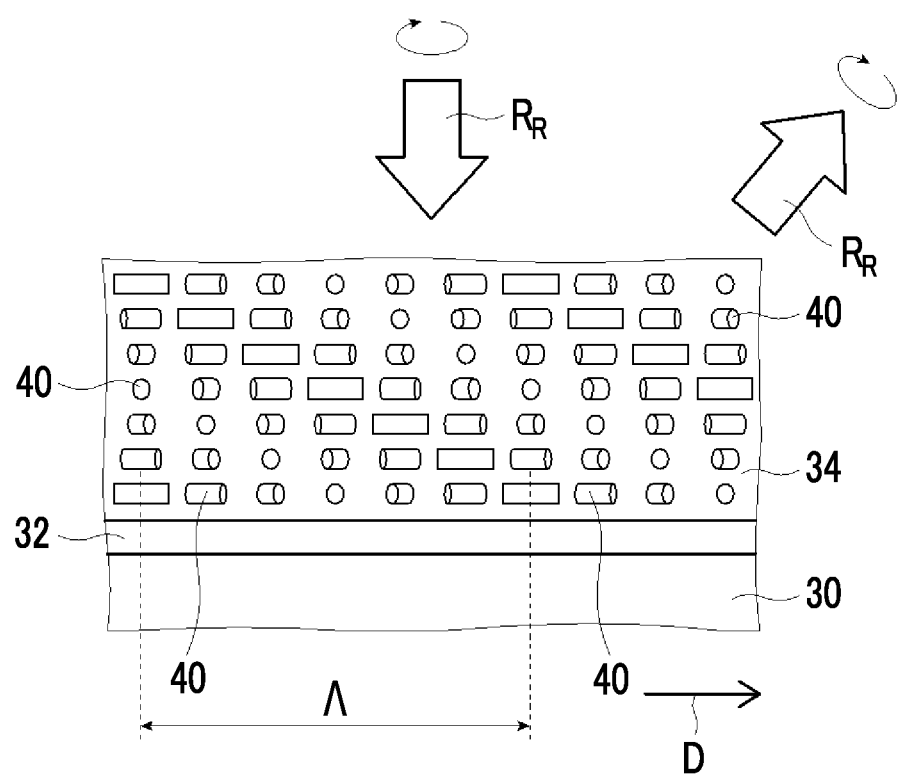
FIG. 13 is a conceptual diagram showing an action of the cholesteric liquid crystal layer shown in FIG. 10.

On the other hand, the cholesteric liquid crystal layer 34 having the configuration in which the arrangement direction of the bright portions and the dark portions is tilted reflects incident light in a state where it is tilted in the arrangement axis D direction with respect to the specular reflection. The cholesteric liquid crystal layer 34 has the liquid crystal alignment pattern in which the optical axis 40A changes while continuously rotating in the arrangement axis D direction in a plane (the predetermined one in-plane direction). Hereinafter, the description will be made with reference to FIG. 13.

For example, the cholesteric liquid crystal layer 34 selectively reflects right circularly polarized light $R^R$ of red light. Accordingly, in a case where light is incident into the cholesteric liquid crystal layer 34, the cholesteric liquid crystal layer 34 reflects only right circularly polarized light $R_R$ of red light and allows transmission of the other light.

Here, in the cholesteric liquid crystal layer 34, the optical axis 40A of the liquid crystal compound 40 changes while rotating in the arrangement axis D direction (the one in-plane direction). In addition, the liquid crystal alignment pattern formed in the cholesteric liquid crystal layer 34 is a pattern that is periodic in the arrangement axis D direction. Therefore, as conceptually shown in FIG. 13, the right circularly polarized light $R_R$ of red light incident into the cholesteric liquid crystal layer 34 is reflected (diffracted) in a direction corresponding to the period of the liquid crystal alignment pattern, and the reflected right circularly polarized light $R_R$ of red light is reflected (diffracted) in a direction tilted with respect to the XY plane (the main surface of the cholesteric liquid crystal layer) in the arrangement axis D direction.

Accordingly, in the cholesteric liquid crystal layer 34, by appropriately setting the arrangement axis D direction as the one in-plane direction in which the optical axis 40A rotates, the reflection direction (diffraction angle) of light can be adjusted.

In addition, in a case where circularly polarized light having the same wavelength and the same turning direction is reflected, by reversing the rotation direction of the optical axis 40A of the liquid crystal compound 40 toward the arrangement axis D direction, a reflection direction of the circularly polarized light can be reversed.

That is, in FIGS. 10 and 11, the rotation direction of the optical axis 40A toward the arrangement axis D direction is clockwise, and one circularly polarized light is reflected in a state where it is tilted in the arrangement axis D direction. By setting the rotation direction of the optical axis 40A to be counterclockwise, the circularly polarized light is reflected in a state where it is tilted in a direction opposite to the arrangement axis D direction.

Further, in the liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

In the liquid crystal layer having the liquid crystal alignment pattern, as the single period Λ decreases, the angle of reflected light with respect to the incidence light increases. That is, as the single period Λ decreases, reflected light can be reflected in a state where it is largely tilted with respect to incidence light. Accordingly, the single period of the liquid crystal alignment pattern in the liquid crystal layer of each of the diffraction elements may be appropriately set depending on the diffraction angles, arrangement, and the like of the diffraction elements.

The periods (single periods Λ) of the diffraction structures of the diffraction elements are preferably 0.1 µm to 10 µm, more preferably 0.1 µm to 1 µm, still more preferably 0.1 µm to 0.8 µm, and still more preferably a wavelength 2 or less of incident light from the viewpoint of propagating light in the light guide plate by total reflection.

Here, the example shown in FIG. 11 shows the configuration in which, on the X-Z plane of the cholesteric liquid crystal layer 34, the optical axis 40A of the liquid crystal compound 40 is aligned to be parallel to the main surface (X-Y plane). However, the present invention is not limited to this configuration. For example, as shown in FIG. 14, a configuration in which, on the X-Z plane of the cholesteric liquid crystal layer 34, the optical axes 40A of the liquid crystal compound 40 is aligned to be tilted with respect to the main surface (X-Y plane) may be adopted.

In addition, the example shown in FIG. 14 shows the configuration in which, on the X-Z plane of the cholesteric liquid crystal layer 34, the tilt angle of the liquid crystal compound 40 with respect to the main surface (X-Y plane) is uniform in the thickness direction (Z direction). However, the present invention is not limited to this configuration. In the cholesteric liquid crystal layer 34, a region where the tilt angle of the liquid crystal compound 40 varies in the thickness direction may be provided.

Figure 15:
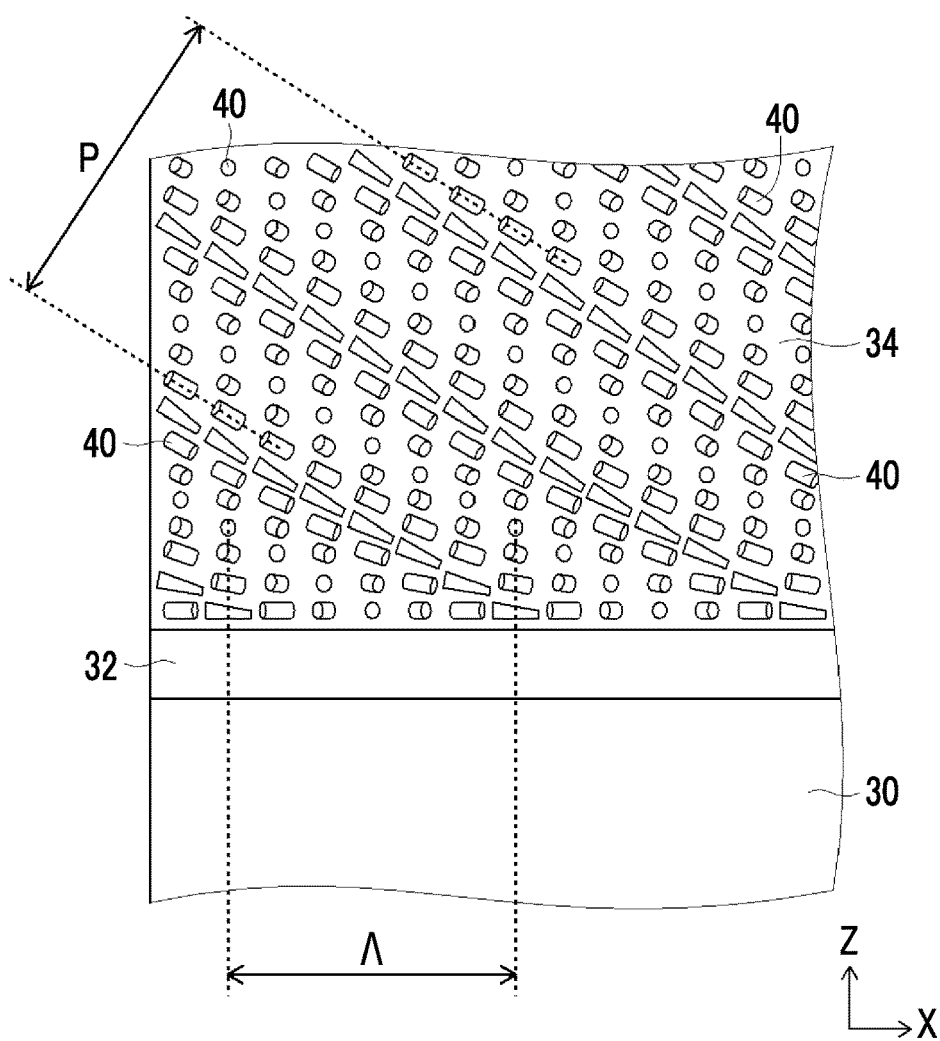
FIG. 15 is a diagram conceptually showing another example of the cholesteric liquid crystal layer used as a liquid crystal diffraction element.

For example, in an example shown in FIG. 15, the optical axis 40A of the liquid crystal compound 40 at an interface of the cholesteric liquid crystal layer on the alignment film 32 side is parallel to the main surface (the pretilt angle is 0°), the tilt angle of the liquid crystal compound 40 increases in a direction away from the interface on the alignment film 32 side to the thickness direction, and the liquid crystal compound is aligned at a given tilt angle on another interface (air interface) side.

This way, the cholesteric liquid crystal layer may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 80° and more preferably 10° to 50°. The average tilt angle can be measured by observing the X-Z plane of the cholesteric liquid crystal layer 34 with a polarization microscope. In particular, it is preferable that, on the X-Z plane of the cholesteric liquid crystal layer 34, the optical axis 40A of the liquid crystal compound 40 is aligned to be tilted with respect to the main surface (X-Y plane) in the same direction.

In a case where the cross section of the cholesteric liquid crystal layer is observed with a polarization microscope, the tilt angle is a value obtained by measuring the angle between the optical axis 40A of the liquid crystal compound 40 and the main surface at any five or more positions and obtaining the average value thereof.

Light that is vertically incident into the diffraction element (cholesteric liquid crystal layer) travels obliquely in an oblique direction in the cholesteric liquid crystal layer along with a bending force. In a case where light travels in the cholesteric liquid crystal layer, diffraction loss is generated due to a deviation from conditions such as a diffraction period that are set to obtain a desired diffraction angle originally with respect to the vertically incident light.

In a case where the liquid crystal compound is tilted, an orientation in which a higher birefringence index is generated with respect to an orientation in which light is diffracted is present as compared to a case where the liquid crystal compound is not tilted. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is desirable that the tilt angle is controlled by treating the interface of the liquid crystal layer. By pretilting the alignment film on the support side interface, the tilt angle of the liquid crystal compound can be controlled. For example, by obliquely exposing the alignment film to ultraviolet light from the front during the formation of the alignment film, the liquid crystal compound in the cholesteric liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present. This configuration is suitable for improving the diffraction efficiency because it contributes to the most improvement of birefringence in the desired direction in a case where light is diffracted in the direction.

Further, an additive for promoting the pretilt angle can also be added to the cholesteric liquid crystal layer or to the alignment film. In this case, the additive can be used as a factor for further improving the diffraction efficiency.

This additive can also be used for controlling the pretilt angle on the air side interface.

Here, in the cholesteric liquid crystal layer, it is preferable that, in a case where an in-plane retardation Re is measured from a normal direction and a direction tilted with respect to a normal line, a direction in which the in-plane retardation Re is minimum in any one of a slow axis plane or a fast axis plane is tilted from the normal direction. Specifically, it is preferable that an absolute value of the measured angle between the direction in which the in-plane retardation Re is minimum and the normal line is 5° or more. In other words, it is preferable that the liquid crystal compound of the cholesteric liquid crystal layer is tilted with respect to the main surface and the tilt direction substantially matches with the bright portions and the dark portions of the cholesteric liquid crystal layer. The normal direction is a direction perpendicular to the main surface.

By the cholesteric liquid crystal layer having the above-described configuration, circularly polarized light can be diffracted with a higher diffraction efficiency than the cholesteric liquid crystal layer in which the liquid crystal compound is parallel to the main surface.

In the configuration in which the liquid crystal compound of the cholesteric liquid crystal layer is tilted with respect to the main surface and the tilt direction substantially matches the bright portions and the dark portions, bright portions and dark portions corresponding to a reflecting surface matches the optical axis of the liquid crystal compound. Therefore, the action of the liquid crystal compound on light reflection (diffraction) increases, the diffraction efficiency can be improved. As a result, the amount of reflected light with respect to incidence light can be further improved.

In a fast axis plane or a slow axis plane of the cholesteric liquid crystal layer, the absolute value of the optical axis tilt angle of the cholesteric liquid crystal layer is preferably 5° or more, more preferably 15° or more, and still more preferably 20° or more.

It is preferable that the absolute value of the optical axis tilt angle is 15° or more from the viewpoint that the direction of the liquid crystal compound matches the bright portions and the dark portions more suitably such that the diffraction efficiency can be improved.

Figure 16:
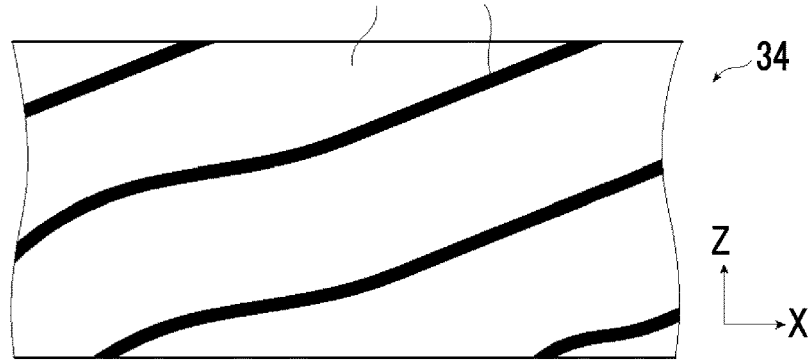
FIG. 16 is a diagram conceptually showing another example of the cholesteric liquid crystal layer used as a liquid crystal diffraction element.

In addition, as in the cholesteric liquid crystal layer shown in FIG. 16, a cholesteric liquid crystal layer having a configuration in which the shape of the bright and dark lines consisting of the bright portions 42 and the dark portions 44 derived from the cholesteric liquid crystalline phase observed in the X-Z plane with a SEM is wave-like (flapping structure) can also be used. The cholesteric liquid crystal layer in which the shape of the bright and dark lines is the flapping structure can diffuse light. Therefore, the viewing angle of an image displayed by a projection type image display system can be increased.

The cholesteric liquid crystal layer shown in FIG. 16 has the same configuration as the cholesteric liquid crystal layer shown in FIG. 12, except that the shape of the bright and dark lines consisting of the bright portions 42 and the dark portions 44 is wave-like.

That is, the cholesteric liquid crystal layer shown in FIG. 16 has a cholesteric liquid crystal structure in which an angle between the helical axis and the surface of the reflective layer periodically changes. In other words, the cholesteric liquid crystal layer has a cholesteric liquid crystal structure, the cholesteric liquid crystal structure provides a stripe pattern including the bright portions and the dark portions in a cross-sectional view that is observed with a SEM, and an angle between a normal line of a line formed by a dark portion and the surface of the reflective layer periodically changes.

It is preferable that the flapping structure is a structure in which at least one region M where an absolute value of a tilt angle of a continuous line of the bright portions or the dark portions that form the stripe pattern with respect to a plane of the cholesteric liquid crystal layer is 5° or more is present, and a peak or valley having a tilt angle of 0° is specified at two points most adjacent to each other with the region M interposed therebetween in a plane direction.

The peak or valley having a tilt angle of 0° may have a protrusion shape or a recessed shape. However, the peak or valley may be a point having a stepwise shape or a rack shape as long as it has a tilt angle of 0°. In the flapping structure, it is preferable that the region M in which an absolute value of a tilt angle of a continuous line of the bright portions or the dark portions in the stripe pattern is 5° or more and the peak or valley in which the region M is interposed are repeated multiple times.

The cholesteric liquid crystal layer having the flapping structure can be formed by forming the cholesteric liquid crystal layer on a formation surface on which an alignment treatment such as rubbing is not performed.

<<Method of Forming Cholesteric Liquid Crystal Layer>>

The cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 40 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

——Polymerizable Liquid Crystal Compound——

The polymerizable liquid crystal compound may be a rod-like liquid crystal compound or a disk-like liquid crystal compound.

Examples of the rod-like polymerizable liquid crystal compound for forming the cholesteric liquid crystalline phase include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

——Disk-Like Liquid Crystal Compound——

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

——Surfactant——

The liquid crystal composition used for forming the cholesteric liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

The surfactants may be used alone or in combination of two or more kinds.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

——Chiral Agent (Optically Active Compound)——

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01 to 200 mol % and more preferably 1 to 30 mol % with respect to the content molar amount of the liquid crystal compound.

——Polymerization Initiator——

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which can initiate a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

——Crosslinking Agent——

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

——Other Additives——

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. These organic solvents may be used alone or in combination of two or more kinds. Among these, a ketone is preferable in consideration of an environmental burden.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, in a case where the cholesteric liquid crystal layer is formed on the alignment film 32, it is preferable that the cholesteric liquid crystal layer obtained by immobilizing a cholesteric liquid crystalline phase is formed by applying the liquid crystal composition to the alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

In addition, as a method of forming the cholesteric liquid crystal layer, a method of forming a tilted liquid crystal layer that is formed of a composition including a disk-like liquid crystal compound and in which a molecular axis of the disk-like liquid crystal compound is tilted with respect to the surface and forming a cholesteric liquid crystal layer on the tilted liquid crystal layer using a composition including a liquid crystal compound is suitably used.

The method of forming the cholesteric liquid crystal layer using the tilted liquid crystal layer is described in paragraphs "0049" to "0194" of WO2019/181247A.

The thickness of the cholesteric liquid crystal layer is not particularly limited, and the thickness with which a required light reflectivity can be obtained may be appropriately set depending on the use of the reflective liquid crystal diffraction element, the light reflectivity required for the cholesteric liquid crystal layer, the material for forming the cholesteric liquid crystal layer, and the like.

Herein, in a case where the incidence diffraction element, the intermediate diffraction element, and the emission diffraction element are configured to include a liquid crystal layer having wavelength selectivity, for example, a cholesteric liquid crystal layer, each of the diffraction elements may be configured to include one liquid crystal layer having wavelength selectivity or to include two or more liquid crystal layers having wavelength selectivity.

In a case where the diffraction element includes two or more liquid crystal layers, it is preferable that, in a cross section of each of the two or more liquid crystal layers observed with a scanning electron microscope, bright portions and dark portions derived from a liquid crystal phase are tilted with respect to a main surface of the liquid crystal layer, and in a case where an interval between bright portions or between dark portions in a normal direction with respect to a tilted surface is set as ½ pitch, pitches P of the liquid crystal layers are different from each other. That is, it is preferable that the wavelength selectivities of the two or more liquid crystal layers are different from each other.

For example, the diffraction element may include two liquid crystal layers including a liquid crystal layer that selectively reflects red light and a liquid crystal layer that selectively reflects green light, and may include three liquid crystal layers including a liquid crystal layer that selectively reflects red light, a liquid crystal layer that selectively reflects green light, and a liquid crystal layer that selectively reflects blue light.

In a configuration where the diffraction element includes a plurality of liquid crystal layers, for example, the liquid crystal layers reflect three color components including red light, green light, and blue light, respectively, such that the light guide element can display a color image.

For example, the diffraction element also may be configured to include three liquid crystal layers having different selective reflection center wavelengths and to reflect not only light of one color or two colors selected from visible light such as red light, green light, or blue light but also infrared light and/or ultraviolet light or to reflect only light other than visible light.

Alternatively, the diffraction element may include two or four or more liquid crystal layers having different selective reflection center wavelengths. In addition, the diffraction element may be configured to reflect light other than visible light such as infrared light and/or ultraviolet light in addition to visible light such as red light, green light, and blue light. Alternatively, each of the liquid crystal layers may be configured to reflect light other than visible light such as infrared light and/or ultraviolet light.

In addition, in a case where the diffraction element includes two or more liquid crystal layers, it is preferable that lengths over which the directions of the optical axes derived from the liquid crystal compounds in the liquid crystal alignment patterns of the two or more liquid crystal layers rotate by 180° in an in-plane direction, that is, single periods Λ of diffraction structures are different from each other.

Specifically, in a case where the pitches P of the liquid crystal layers are different from each other, it is preferable that a permutation of the pitches P (the lengths of the selective reflection center wavelengths) and a permutation of the lengths of the single periods Λ in the liquid crystal alignment patterns of the liquid crystal layers are the same as each other. As a result, the tilt angles of the bright portions and the dark portions in the SEM cross sections of the liquid crystal layers can be made to substantially match with each other, and the diffraction angles with respect to light having the selective reflection wavelengths of the liquid crystal layers can be made to substantially match with each other. That is, light components having different wavelengths can be diffracted in substantially the same direction.

For example, in a case where the liquid crystal diffraction element includes two liquid crystal layers including a first liquid crystal layer and a second liquid crystal layer, in a case where a pitch of the first liquid crystal layer is represented by P1, a single period of the first liquid crystal layer is represented by Λ1, a pitch of the second liquid crystal layer is represented by P2, and a single period of the second liquid crystal layer is represented by Λ2, it is preferable that P1<P2 and Λ1<Λ2 are satisfied.

(Transmission Type Liquid Crystal Diffraction Element)

The transmission type liquid crystal diffraction element is a liquid crystal diffraction element that has the liquid crystal alignment pattern where the optical axis continuously rotates in at least one in-plane direction and in which the liquid crystal compound does not form a cholesteric liquid crystalline phase in the thickness direction. The liquid crystal diffraction element may have a configuration in which the liquid crystal compound is helically twisted and rotates in the thickness direction to some extent that a cholesteric liquid crystalline phase is not formed.

Figure 18:
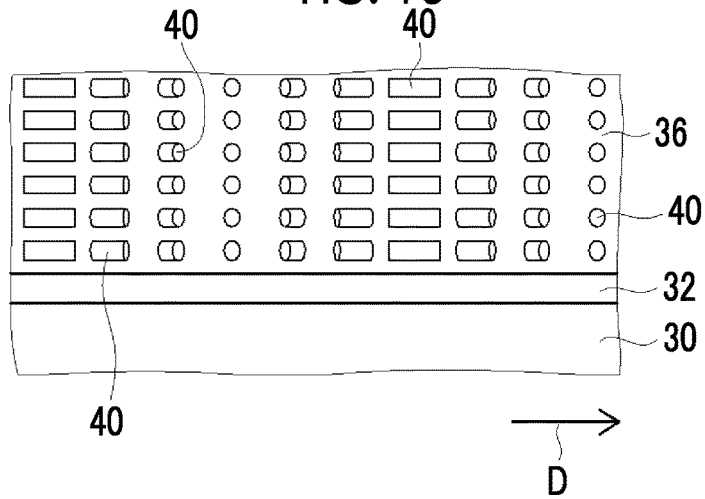
FIG. 18 is a diagram conceptually showing an example of a liquid crystal layer in a transmissive liquid crystal diffraction element.
Figure 19:
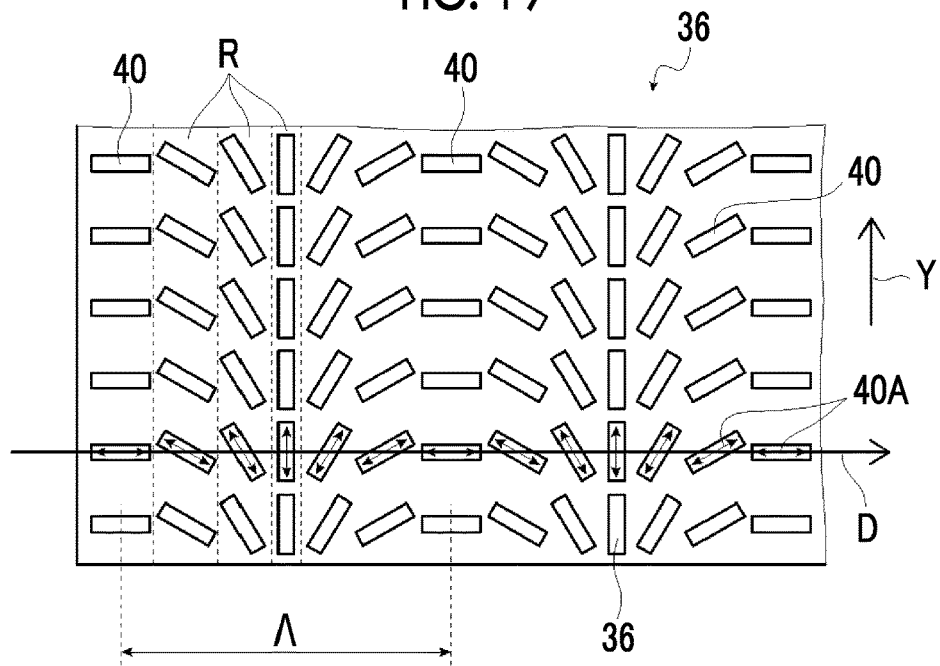
FIG. 19 is a plan view showing the liquid crystal layer shown in FIG. 18.

FIGS. 18 and 19 show an example of the transmission type liquid crystal diffraction element.

A transmission type liquid crystal diffraction element shown in FIGS. 18 and 19 includes the support 30, the alignment film 32, and a liquid crystal layer 36.

As in the cholesteric liquid crystal layer 34, as shown in FIG. 19, the liquid crystal layer 36 of the transmission type liquid crystal diffraction element also has the liquid crystal alignment pattern in which the optical axis 40A of the liquid crystal compound 40 continuously rotates in the arrangement axis D direction. FIG. 19 also shows only the liquid crystal compound of the surface of the alignment film 32 as in FIG. 10.

In the transmission type liquid crystal diffraction element, the liquid crystal compound 40 forming the liquid crystal layer 36 is not helically twisted and does not rotate in the thickness direction, and the optical axis 40A is positioned at the same position in the plane direction. The liquid crystal layer can be formed by adding a chiral agent to a liquid crystal composition during the formation of the cholesteric liquid crystal layer.

As described above, the liquid crystal layer 36 has the liquid crystal alignment pattern in which the direction of the optical axis 40A derived from the liquid crystal compound 40 changes while continuously rotating in the arrangement axis D direction in a plane.

On the other hand, regarding the liquid crystal compound 40 forming the liquid crystal layer 36, the liquid crystal compounds 40 having the same direction of the optical axes 40A are arranged at regular intervals in the Y direction perpendicular to the arrangement axis D direction, that is, the Y direction perpendicular to the one in-plane direction in which the optical axis 40A continuously rotates.

In other words, regarding the liquid crystal compound 40 forming the liquid crystal layer 36, in the liquid crystal compounds 40 arranged in the Y direction, angles between the directions of the optical axes 40A and the arrangement axis D direction are the same.

In the liquid crystal compounds arranged in the Y direction in the liquid crystal layer 36, the angles between the optical axes 40A and the arrangement axis D direction (the one in-plane direction in which the direction of the optical axis of the liquid crystal compound 40 rotates) are the same. Regions where the liquid crystal compounds 40 in which the angles between the optical axes 40A and the arrangement axis D direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference Δn in refractive index is the same as the difference in refractive index of the liquid crystal compound 40.

In a case where circularly polarized light is incident into the above-described liquid crystal layer 36, the light is refracted such that the direction of the circularly polarized light is converted.

Figure 20:
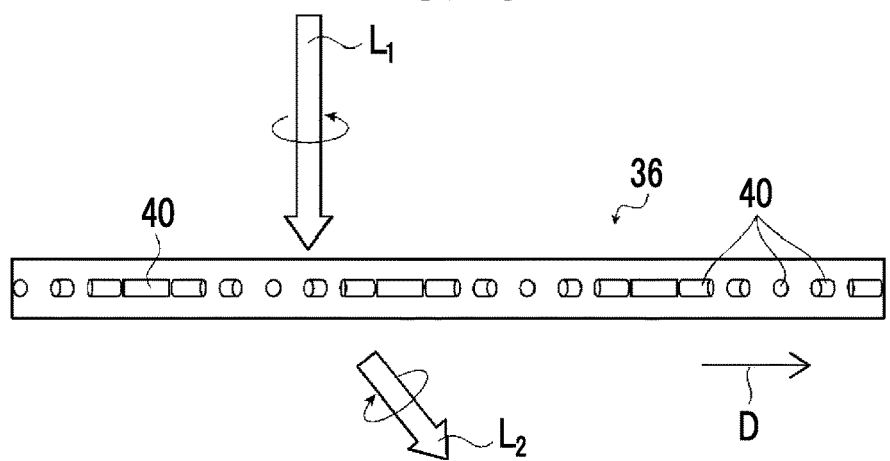
FIG. 20 is a conceptual diagram showing the action of the liquid crystal layer shown in FIG. 18.
Figure 21:
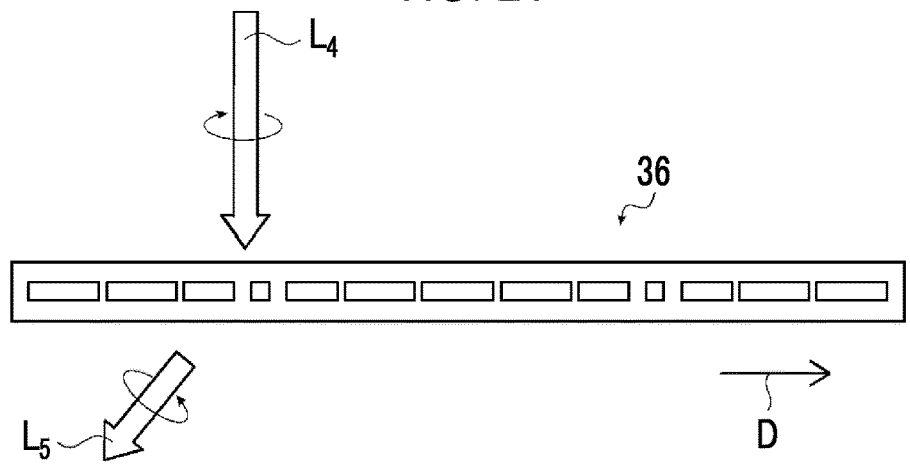
FIG. 21 is a conceptual diagram showing the action of the liquid crystal layer shown in FIG. 18.
Figure 22:
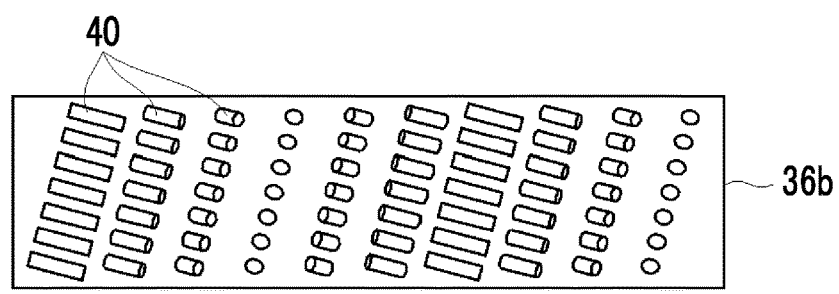
FIG. 22 is a diagram conceptually showing another example of the liquid crystal layer.

This action is conceptually shown in FIGS. 20 and 21. In the liquid crystal layer 36, the value of the product of the difference in refractive index of the liquid crystal compound and the thickness of the optically-anisotropic layer is λ/2.

As shown in FIG. 20, in a case where the value of the product of the difference in refractive index of the liquid crystal compound in the liquid crystal layer 36 and the thickness of the optically-anisotropic layer is λ/2 and incidence light $L_1$ as left circularly polarized light is incident into the liquid crystal layer 36, the incidence light $L_1$ transmits through the liquid crystal layer 36 to be imparted with a phase difference of 180°, and the transmitted light $L_2$ is converted into right circularly polarized light.

In addition, the liquid crystal alignment pattern formed in the liquid crystal layer 36 is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a given angle in the arrangement axis D direction with respect to an incidence direction.

On the other hand, as shown in FIG. 21, in a case where the value of the product of the difference in refractive index of the liquid crystal compound in the liquid crystal layer 36 and the thickness of the optically-anisotropic layer is λ/2 and incidence light $L_4$ of right circularly polarized light is incident into the liquid crystal layer 36, the incidence light $L_4$ transmits through the liquid crystal layer 36 to be imparted with a phase difference of 180°, and the incidence light $L_4$ is converted into transmitted light $L_5$ of left circularly polarized light.

In addition, the liquid crystal alignment pattern formed in the liquid crystal layer 36 is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrow X direction with respect to the incidence direction. This way, the incidence light $L_4$ is converted into the transmitted light $L_5$ of left circularly polarized light that is tilted by a given angle in a direction opposite to the arrangement axis D direction with respect to an incidence direction.

As in the cholesteric liquid crystal layer 34, by changing the single period Λ of the liquid crystal alignment pattern formed in the liquid crystal layer 36, refraction angles of the transmitted light components $L_2$ and $L_5$ can be adjusted. Specifically, even in the liquid crystal layer 36, as the single period Λ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrangement axis D direction, the refraction direction of transmitted light can be reversed. That is, in the example FIGS. 18 and 19, the rotation direction of the optical axis 40A toward the arrangement axis D direction is clockwise. By setting this rotation direction to be counterclockwise, the refraction direction of transmitted light can be reversed.

From the viewpoint of diffraction efficiency, even in a case where the liquid crystal diffraction element that allows transmission of incidence light and diffracts incidence light is used, it is preferable to use a liquid crystal diffraction element having a region where the liquid crystal compound is twisted and rotates (the twisted angle is less than 360°). In particular, in a case where light is diffracted at an angle where total reflection occurs in the light guide plate, from the viewpoint of diffraction efficiency, a liquid crystal diffraction element including a region in which a liquid crystal compound is twisted and rotates can be suitably used. In addition, from the viewpoint of diffraction efficiency, it is preferable to use a laminate in which liquid crystal diffraction elements having different angles at which the liquid crystal compound is twisted and rotates is laminated, or it is preferable to use a laminate in which liquid crystal diffraction elements having different directions in which the liquid crystal compound is twisted and rotates are laminated.

In addition, the liquid crystal diffraction element having a region in which the liquid crystal compound is twisted and rotates (the twisted angle is less than 360°) without being cholesterically aligned can also be used as a reflective diffraction element. This liquid crystal diffraction element can also function as a reflective diffraction element in which diffracted light is reflected from an interface with the liquid crystal diffraction element and emitted from the light incidence side to reflect and diffract the light.

In the light guide element according to the embodiment of the present invention, different kinds of diffraction elements may be used in combination as the diffraction elements. For example, a transmissive liquid crystal diffraction element may be used as the incidence diffraction element, and a reflective liquid crystal diffraction element may be used as the intermediate diffraction element and the emission diffraction element.

[Positive Lens]

The positive lens is a lens that collects incident light. As the positive lens, a well-known convex lens in the related art can be used.

In addition, as the positive lens, a diffraction element having a diffraction structure that collects light may be used. In this case, it is preferable that, as the diffraction element, any one of a surface relief type diffraction element, a volume hologram type diffraction element, or a polarization diffraction element is used.

Figure 23:
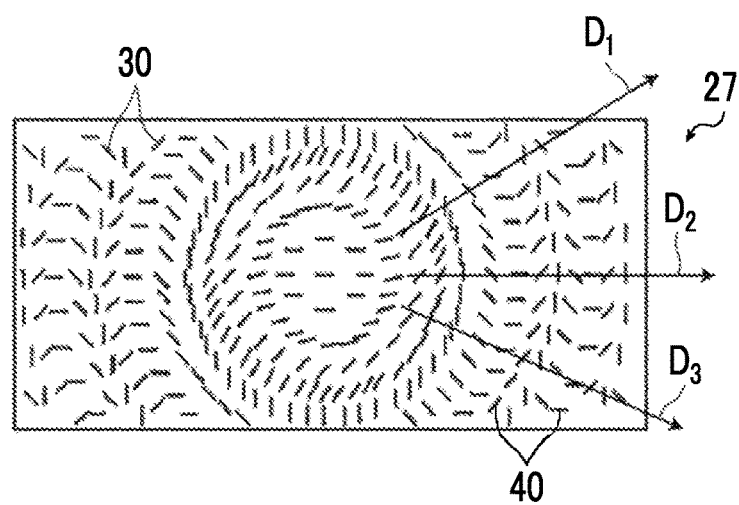
FIG. 23 is a diagram conceptually showing an example of a positive lens formed of a diffraction element.

For example, FIG. 23 is a conceptual diagram showing the positive lens including the liquid crystal diffraction element.

The positive lens shown in FIG. 23 includes a liquid crystal layer 27. FIG. 23 is a front view showing the liquid crystal layer 27.

As in the liquid crystal layer of the liquid crystal diffraction element, the liquid crystal layer 27 shown in FIG. 23 has the liquid crystal alignment pattern in which the direction of the optical axis of the liquid crystal compound 40 changes while continuously rotating and has a concentric circular pattern having a concentric circular shape where the arrangement axis (in FIG. 23, $D_1$, $D_2$, and $D_3$) in which the direction of the optical axis of the liquid crystal compound 40 changes while continuously rotating moves from an inner side toward an outer side. In other words, the liquid crystal alignment pattern of the liquid crystal layer 27 shown in FIG. 23 is a liquid crystal alignment pattern where the arrangement axis in which the direction of the optical axis of the liquid crystal compound 40 changes while continuously rotating is provided in a radial shape from the center of the liquid crystal layer 27.

This way, in the liquid crystal layer 27 having the concentric circular liquid crystal alignment pattern, transmission of incidence light can be allowed as converging light depending on the rotation direction of the optical axis of the liquid crystal compound 40 and the direction of circularly polarized light to be incident.

That is, by setting the liquid crystal alignment pattern of the liquid crystal layer 27 to be concentric circular, a function as a convex lens is exhibited.

Here, in a case where the liquid crystal alignment pattern of the liquid crystal layer is concentric circular such that the optical element functions as a convex lens, it is preferable that the single period Λ over which the optical axis rotates by 180° in the liquid crystal alignment pattern gradually decreases from the center of the liquid crystal layer toward the outer direction.

Figure 24:
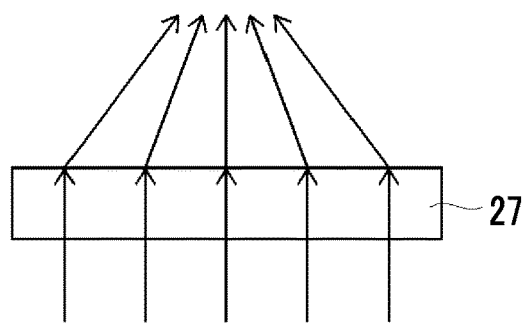
FIG. 24 is a conceptual diagram showing an action of the positive lens shown in FIG. 23.

As described above, the angle at which incident light is refracted increases as the single period Λ in the liquid crystal alignment pattern decreases. Accordingly, the single period Λ in the liquid crystal alignment pattern gradually decreases toward the outer direction from the center of the liquid crystal layer. As shown in FIG. 24, an angle at which light incident into the vicinity of the center of the liquid crystal layer 27 is refracted is small, and an angle where incident light is refracted increases toward the outer side of the liquid crystal layer 27. As a result, the light collecting power of the liquid crystal layer 27 can be improved, and the performance as a convex lens can be improved.

[Negative Lens]

The negative lens is a lens that diffuses incident light. As the negative lens, a well-known concave lens in the related art can be used.

In addition, as the negative lens, a diffraction element having a diffraction structure that diffuses light may be used. In this case, it is preferable that, as the diffraction element, any one of a surface relief type diffraction element, a volume hologram type diffraction element, or a polarization diffraction element is used.

In a case where the diffraction element is the negative lens, as in the positive lens, the diffraction element may have a concentric circular pattern having a concentric circular shape where the arrangement axis of the liquid crystal alignment pattern moves from an inner side toward an outer side.

This way, in the liquid crystal layer having the concentric circular liquid crystal alignment pattern, transmission of incidence light can be allowed as diverging light depending on the rotation direction of the optical axis of the liquid crystal compound and the direction of circularly polarized light to be incident.

That is, by setting the liquid crystal alignment pattern of the liquid crystal layer to be concentric circular, a function as a concave lens is exhibited. In a case where the diffraction element is a concave lens, the direction in which the optical axis rotates by 180° in the liquid crystal alignment pattern may be opposite to that in a case where the diffraction element is a convex lens.

Here, in a case where the liquid crystal alignment pattern of the liquid crystal layer is concentric circular such that the optical element functions as a concave lens, it is preferable that the single period $\Lambda$ over which the optical axis rotates by 180° in the liquid crystal alignment pattern gradually decreases from the center of the liquid crystal layer toward the outer direction.

As described above, the angle at which incident light is refracted increases as the single period $\Lambda$ in the liquid crystal alignment pattern decreases. Accordingly, the single period $\Lambda$ in the liquid crystal alignment pattern gradually decreases toward the outer direction from the center of the liquid crystal layer. As a result, an angle at which light incident into the vicinity of the center of the liquid crystal layer is refracted is small, and an angle where incident light is refracted increases toward the outer side of the liquid crystal layer. Thus, the light diverging power of the liquid crystal layer can be improved, and the performance as a concave lens can be improved.

A method of forming the liquid crystal layer having the concentric circular pattern is described in WO2019/131966A.

Hereinabove, the optical element and the image display apparatus according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of Incidence Diffraction Element>
(Formation of Alignment Film)

A glass substrate was used as the support. The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

Coating Liquid for Forming Alignment Film

| The following material for photo-alignment | 1.00 part by mass |
| Water | 16.00 parts by mass |
| Butoxyethanol | 42.00 parts by mass |
| Propylene glycol monomethyl ether | 42.00 parts by mass |

-Material for Photo-Alignment-

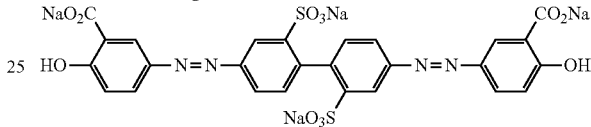

(Exposure of Alignment Film)

The alignment film was exposed using the exposure device shown in FIG. 17 to form an alignment film P-1 having an alignment pattern.

In the exposure device, a laser that emits laser light having a wavelength (325 nm) was used as the laser. The exposure amount of the interference light was 300 mJ/cm$^2$. The single period (the length over which the optical axis rotates by 180°) of an alignment pattern formed by interference of two laser beams was controlled by changing an intersecting angle (intersecting angle $\alpha$) between the two beams.

(Formation of Cholesteric Liquid Crystal Layer)

As the liquid crystal composition forming the cholesteric liquid crystal layer, the following liquid crystal composition AB-1 was prepared. This liquid crystal composition AB-1 is a liquid crystal composition forming a cholesteric liquid crystal layer (cholesteric liquid crystalline phase) that reflects right circularly polarized light.

Liquid Crystal Composition AB-1

| Rod-like liquid crystal compound L-1 | 100.00 parts by mass |
| Polymerization initiator (KAYACURE DETX-S, manufactured by Nippon Kayaku Co., Ltd.) | 1.00 part by mass |
| Chiral agent Ch-1 | 3.90 parts by mass |
| Chiral agent Ch-2 | 1.00 parts by mass |
| Methyl ethyl ketone | 203.00 parts by mass |

Rod-Like liquid crystal compound L-1

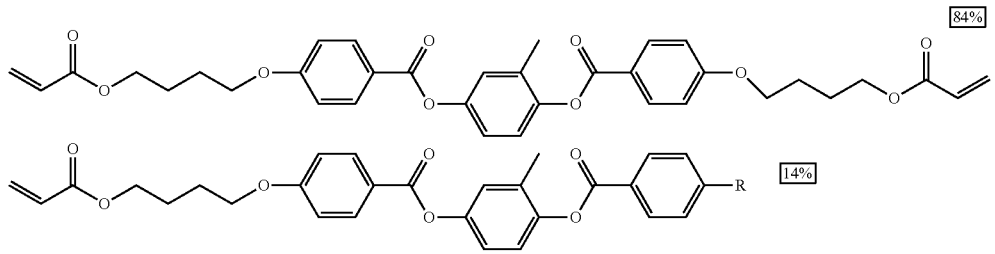

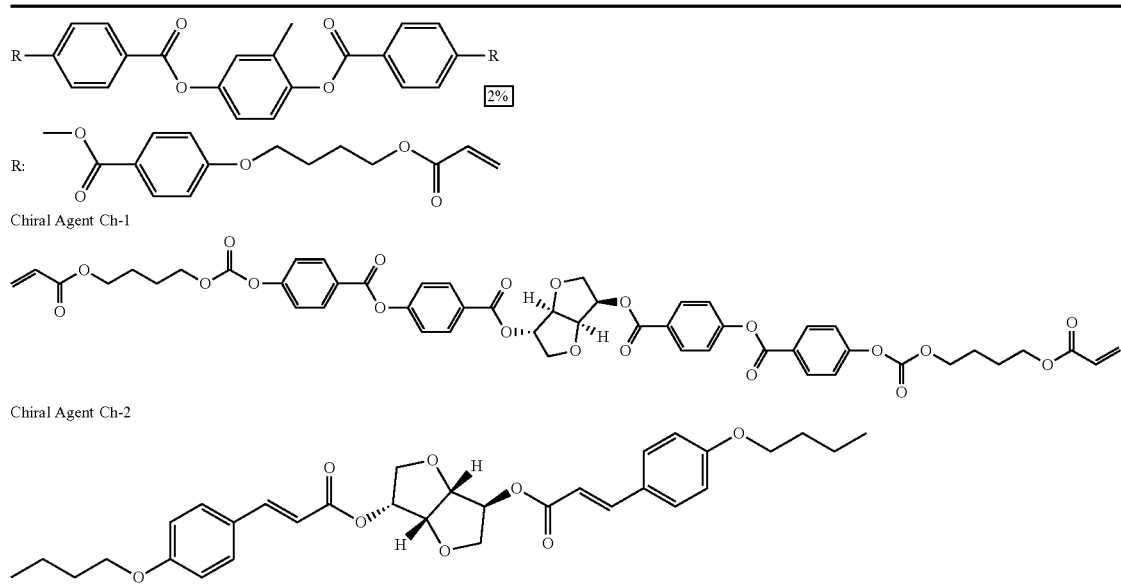

Chiral Agent Ch-1

Chiral Agent Ch-2

The above-described liquid crystal composition AB-1 was applied to the alignment film P-1 using a spin coater.

The coating film of the liquid crystal composition AB-1 was heated on a hot plate at 80° C. for 3 minutes (180 sec). Next, in a first exposure step, the coating film was exposed using a high-pressure mercury lamp at 80° C. in the air atmosphere through a long pass filter of 300 nm and a short pass filter of 350 nm. The first exposure step was performed such that the light irradiation dose measured at a wavelength of 315 nm was 10 mJ/cm². Further, the coating film was irradiated with ultraviolet light having a wavelength of 365 nm at 80° C. at an irradiation dose of 600 mJ/cm² using a high-pressure mercury lamp in a nitrogen atmosphere (second exposure step). As a result, the liquid crystal composition AB-1 was cured, the alignment of the liquid crystal compound was immobilized, and a cholesteric liquid crystal layer was formed.

Thus, a liquid crystal diffraction element including the support, the alignment film, and the cholesteric liquid crystal layer was prepared.

It was verified using a polarization microscope that the cholesteric liquid crystal layer had a periodically aligned surface as shown in FIG. 10.

The cholesteric liquid crystal layer was cut in a direction along the rotation direction of the optical axis, and a cross-section was observed with a SEM. As a result, a shape was observed in which the pitch P of bright portions and dark portions continuously increased and the tilt angle $\theta_{hp}$ continuously increased in the thickness direction from the alignment film side to the side away from the alignment film. The tilt angle $\theta_{hp}$ (tilt angle $\theta_{hp}$ of the bright portions/the dark portions) refers to an angle of the bright portions and the dark portions with respect to the main surface of the cholesteric liquid crystal layer.

In a case where a cross-section was observed with a SEM, the cholesteric liquid crystalline phase had 8 pitches. In addition, the pitch (average value in the thickness direction) of tilted surfaces of bright portions and dark portions with respect to the main surface was 0.39 μm. In addition, in the liquid crystal alignment pattern of the cholesteric liquid crystal layer, the single period over which the optical axis of the liquid crystal compound rotated by 180° was 0.42 μm.

While changing the incidence angle of light to be measured, in-plane retardations Re (in-plane Re) in a fast axis plane and a slow axis plane were measured using "Axoscan" (manufactured by Axometrics, Inc.). The measurement wavelength was set to 750 nm. In addition, the incidence angle of the light to be measured was set to a range of −70° to 70°.

As a result, a direction in which the in-plane retardation of the cholesteric liquid crystal layer was minimum was tilted with respect to the normal line. The result shows that the major axis direction of each liquid crystal molecule was aligned to be tilted with respect to the main surface of the cholesteric liquid crystal layer.

<Preparation of Intermediate Diffraction Element>

An alignment film was formed on the support using the same method as that of the incidence diffraction element, except that, in a case where the alignment film was exposed using the exposure device shown in FIG. 17, the intersecting angle between two light components was changed.

In addition, a liquid crystal composition was prepared using the same method as that of the liquid crystal composition AB-1, except that the amount of the chiral agent Ch-1 and the amount of methyl ethyl ketone were appropriately changed.

An intermediate diffraction element was formed using the same method as that of the incidence diffraction element, except that the liquid crystal composition was used. During the formation of the intermediate diffraction element, the liquid crystal layer was cured and the cholesteric liquid crystal layer was formed in the second exposure step without performing the first exposure step.

The prepared cholesteric liquid crystalline phase had 2 pitches. In addition, the pitch (average value in the thickness direction) of tilted surfaces of bright portions and dark portions with respect to the main surface was 0.44 μm. In addition, in the liquid crystal alignment pattern of the cholesteric liquid crystal layer, the single period over which the optical axis of the liquid crystal compound rotated by 180° was 0.30 μm.

<Preparation of Emission Diffraction Element>

An alignment film was formed on the support using the same method as that of the incidence diffraction element, except that, in a case where the alignment film was exposed using the exposure device shown in FIG. 17, the intersecting angle between two light components was changed.

In addition, a liquid crystal composition was prepared using the same method as that of the liquid crystal composition AB-1, except that the amount of the chiral agent Ch-1 and the amount of methyl ethyl ketone were appropriately changed.

An emission diffraction element was formed using the same method as that of the incidence diffraction element, except that the liquid crystal composition was used. During the formation of the emission diffraction element, the liquid crystal layer was cured and the cholesteric liquid crystal layer was formed in the second exposure step without performing the first exposure step.

The prepared cholesteric liquid crystalline phase had 2 pitches. In addition, the pitch (average value in the thickness direction) of tilted surfaces of bright portions and dark portions with respect to the main surface was 0.42 µm. In addition, in the liquid crystal alignment pattern of the cholesteric liquid crystal layer, the single period over which the optical axis of the liquid crystal compound rotated by 180° was 0.39 µm.

<Preparation of Light Guide Element>

As the light guide plate, a glass light guide plate formed of glass and having a size of 60 mm×70 mm and a thickness of 1 mm was used.

The incidence diffraction element was cut into a circle having a size with a diameter of 6 mm and used. The intermediate diffraction element was cut into a trapezoidal shape having a short side size of 6 mm, a long side size of 15 mm, and a height of 40 mm and used. The emission diffraction element was cut into a square shape having a size of 40 mm×40 mm and used.

Figure 25:
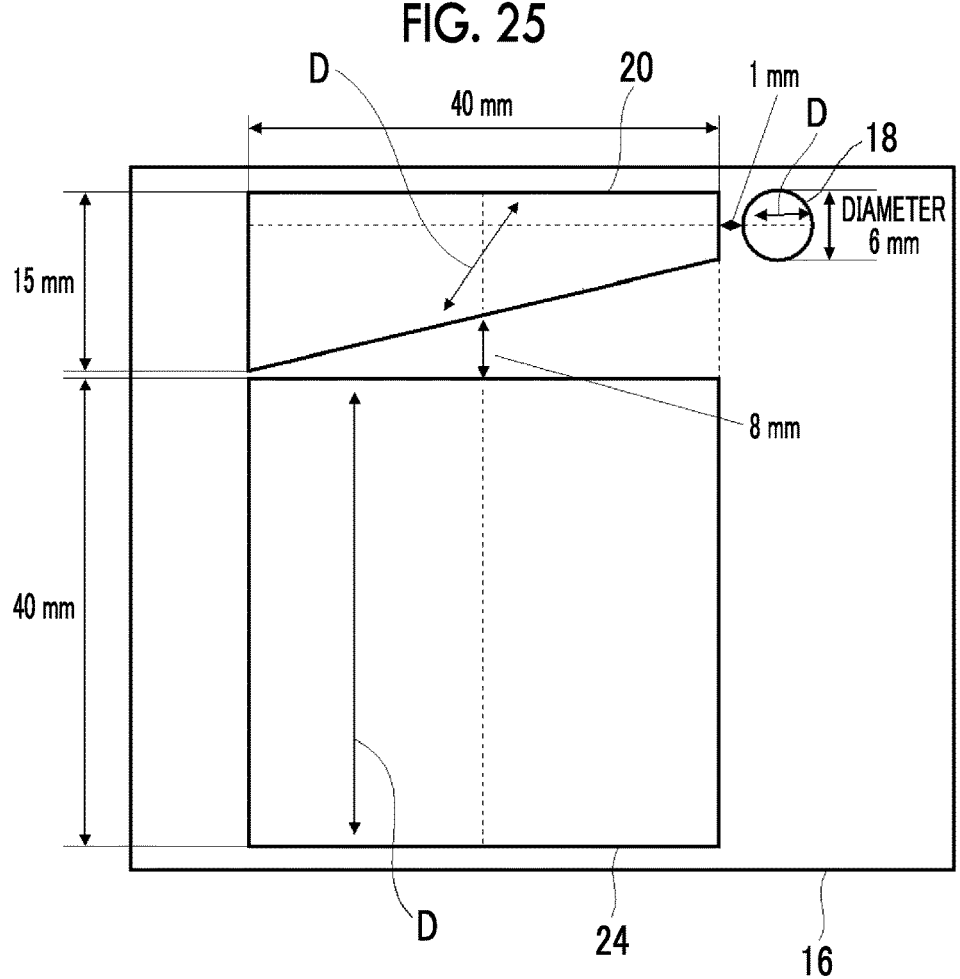
FIG. 25 is a conceptual diagram showing an optical element according to Examples.

During the cutting of each of the diffraction elements, as shown in FIG. 25, a cutting direction and a periodic direction of the diffraction structures were adjusted such that, in a case where the diffraction elements were disposed on the light guide plate, the periodic direction of the direction structures was a predetermined direction.

Each of the prepared diffraction elements was bonded to one main surface of the light guide plate using an adhesive.

Regarding the arrangement of the diffraction elements, the incidence diffraction element was disposed on the upper right side of the main surface of the light guide plate, the intermediate diffraction element was arranged on the left side of the incidence diffraction element, and the emission diffraction element was arranged on the lower side of the intermediate diffraction element.

As shown in FIG. 25, the incidence diffraction element and the intermediate diffraction element were disposed to be spaced from each other by 1 mm in the left-right direction. The intermediate diffraction element and the emission diffraction element were disposed to be spaced from each other by 8 mm in the up-down direction.

<Preparation of Optical Element>

A positive lens was disposed on a main surface side of the prepared light guide element opposite to the main surface side where the emission diffraction element was disposed. As a result, an optical element was prepared.

As the positive lens, a glass lens having a diameter of φ50 mm and a focal length of +150 mm (manufactured by Sigmakoki Co., Ltd.) was used.

The distance between the positive lens and the light guide element was 1 mm.

Example 2

Further, an optical element was prepared using the same method as that of Example 1, except that a negative lens was disposed on a main surface side of the light guide element opposite to the emission diffraction element.

As the negative lens, a glass lens having a diameter of φ50 mm and a focal length of −150 mm (manufactured by Sigmakoki Co., Ltd.) was used.

Example 3

An optical element was prepared using the same method as that of Example 1, except that a focus tunable lens was simulated as the positive lens by replacing and using four kinds of glass lenses having a diameter of φ50 mm and focal lengths of +70 mm, +100 mm, +150 mm, and +200 mm.

Example 4

Further, an optical element was prepared using the same method as that of Example 3, except that a negative lens was disposed on a main surface side of the light guide element opposite to the emission diffraction element.

A focus tunable lens was simulated as the negative lens by replacing and using four kinds of glass lenses having a diameter of φ50 mm and focal lengths of −70 mm, −100 mm, −150 mm, and −200 mm.

[Evaluation 1]

By disposing a display element that emits an image on the incidence diffraction element of the prepared optical element, an image display apparatus was prepared, and the evaluation of the aerial image and the background image was performed.

As the display element, a display that emits an image of right circularly polarized light was used. This display was a projection type liquid crystal display element in which a projection light source and a convex lens were combined with a reflective type liquid crystal display element. Linearly polarized light emitted from the reflective type liquid crystal display element was converted into right circularly polarized light by the λ/4 plate.

By displaying the image using the prepared image display apparatus, whether or not the aerial image was abled to be displayed and the visibility of the background image were evaluated.

As a result, in all of Examples, the aerial image was able to be recognized. In addition, in this case, the background image was also able to be recognized. In Examples 1 and 3, the background image was distorted. However, in Examples 2 and 4 where the negative lens was provided, the distortion of the background image was not recognized.

[Evaluation 2]

The focal position of the aerial image to be displayed was evaluated as follows.

The image was displayed using the prepared image display apparatus, the focal point of the aerial image was adjusted to be in focus, and paper on which characters were written was disposed at a position where the paper and the aerial image were in focus at the same time. Next, the distance between the paper and the positive lens was measured to acquire the focal position of the aerial image. As a result, it was verified that, in all of Examples, the aerial image was displayed substantially at the position of the focal length of the positive lens.

In addition, it was verified that, in Examples 3 and 4, the position of the aerial image was changed by replacing the lens to change the focal length. That is, it was verified that the position of the aerial image can be changed by using the focus tunable lens.

The results are shown in Table 1.

TABLE 1

|  |  | Example 1 | Example 2 | Example 3 | Example 4 |
|---|---|---|---|---|---|
| Incidence Diffraction Element | Kind | Polarization Diffraction | Polarization Diffraction | Polarization Diffraction | Polarization Diffraction |
|  | Single Period Λ [μm] | 0.42 | 0.42 | 0.42 | 0.42 |
|  | Tilted Surface Pitch P [μm] | 0.39 | 0.39 | 0.39 | 0.39 |
| Intermediate Diffraction Element | Kind | Polarization Diffraction | Polarization Diffraction | Polarization Diffraction | Polarization Diffraction |
|  | Single Period Λ [μm] | 0.30 | 0.30 | 0.30 | 0.30 |
|  | Tilted Surface Pitch P [μm] | 0.44 | 0.44 | 0.44 | 0.44 |
| Emission Diffraction Element | Kind | Polarization Diffraction | Polarization Diffraction | Polarization Diffraction | Polarization Diffraction |
|  | Single Period Λ [μm] | 0.42 | 0.42 | 0.42 | 0.42 |
|  | Tilted Surface Pitch P [μm] | 0.39 | 0.39 | 0.39 | 0.39 |
| Positive Lens | Presence | Provided | Provided | Provided | Provided |
|  | Focal Length +fp [μm] | +150 | +150 | Variable | Variable |
| Negative Lens | Presence | Not Provided | Provided | Not Provided | Provided |
|  | Focal Length −fn [μm] | — | −150 | — | Variable |
| Ratio fn/fp between Focal Lengths of Negative and Positive Lenses |  | — | 1 | — | 1 |
| Evaluation | Aerial Image | Visible | Visible | Visible Position Variable | Visible Position Variable |
|  | Background Image | Visible | Visible No Distortion | Visible | Visible No Distortion |

As can be seen from the above results, the effects of the present invention are obvious.

EXPLANATION OF REFERENCES 10, 10b, 10c: image display apparatus
12: display element
13, 13b, 13c: optical element
14, 14b, 14d: light guide element
16: light guide plate
18: incidence diffraction element
20: intermediate diffraction element
24: emission diffraction element
26: positive lens
27, 36: liquid crystal layer
28: negative lens
30: support
32: alignment film
34: cholesteric liquid crystal layer
40: liquid crystal compound
40A: optical axis
60: exposure device
62: laser
64: light source
65: λ/2 plate
68: beam splitter
70a, 70B: mirror
72A, 72B: λ/4 plate
110, 112: region
G1: aerial image
H1: focal plane
K1, K2, K3: imaging point
U: user
D1: surface relief type diffraction element
D2: volume hologram type diffraction element
P: helical pitch
A: single period
$L_1$, $L_4$: incidence light
$L_2$, $L_5$: emitted light
M: laser light
MA, MB: beam
$P_O$: linearly polarized light
$P_R$: right circularly polarized light
$P_L$: left circularly polarized light

What is claimed is:

1. An optical element comprising:
a light guide element including a light guide plate, an incidence diffraction element, and an emission diffraction element,
the incidence diffraction element being disposed on a main surface of the light guide plate and
the emission diffraction element being disposed on the main surface of the light guide plate; and
a positive lens that is disposed at a position overlapping the emission diffraction element in a view from a direction perpendicular to the main surface of the light guide plate, and
a negative lens that is disposed on a side of the light guide element opposite to the positive lens,
wherein the incidence diffraction element diffracts incident light such that the diffracted light is incident into the light guide plate,
the emission diffraction element emits light propagating in the light guide plate from the light guide plate,
the positive lens collects the light that is emitted from the light guide plate by the emission diffraction element,
the negative lens is a polarization diffraction element,
the polarization diffraction element is a liquid crystal diffraction element that includes a liquid crystal layer including a liquid crystal compound, the liquid crystal layer has a liquid crystal alignment pattern in which a direction of an optical axis derived from the liquid crystal compound changes while continuously rotating in at least one in-plane direction, the liquid crystal diffraction element includes two or more liquid crystal layers, and in a cross section of each of the two or more liquid crystal layers observed with a scanning electron microscope, bright portions and dark portions derived from a liquid crystal phase are tilted with respect to a main surface of the liquid crystal layer, and in a case where an interval between bright portions or between dark portions in a normal direction with respect to a tilted surface is set as ½ pitch, pitches of the liquid crystal layers are different from each other.

2. The optical element according to claim 1, wherein the light guide element and the positive lens are spaced from each other.

3. The optical element according to claim 1, wherein the positive lens is larger than the emission diffraction element.

4. The optical element according to claim 1, wherein the light guide element and the negative lens are spaced from each other.

5. The optical element according to claim 1, wherein in a case where a focal length of the positive lens is represented by +fp and a focal length of the negative lens is represented by −fn, fp and fn satisfy $$0.7 \leq fn/fp \leq 1.3.$$

6. The optical element according to claim 1, wherein the positive lens is a focus tunable lens.

7. The optical element according to claim 1, wherein the positive lens is any one of a surface relief type diffraction element, a volume hologram type diffraction element, or a polarization diffraction element.

8. The optical element according to claim 1, wherein the light guide element includes an intermediate diffraction element disposed on the main surface of the light guide plate, and the intermediate diffraction element diffracts the light that is diffracted by the incidence diffraction element to be incident into the light guide plate and propagates in the light guide plate toward the emission diffraction element.

9. The optical element according to claim 8, wherein a period of a diffraction structure of the intermediate diffraction element is 0.1 μm to 1 μm.

10. The optical element according to claim 8, wherein the intermediate diffraction element is any one of a surface relief type diffraction element, a volume hologram type diffraction element, or a polarization diffraction element.

11. The optical element according to claim 1, wherein each of the incidence diffraction element and the emission diffraction element is any one of a surface relief type diffraction element, a volume hologram type diffraction element, or a polarization diffraction element.

12. The optical element according to claim 1, wherein the liquid crystal layer has a region in which the direction of the optical axis of the liquid crystal compound is twisted and rotates in a thickness direction.

13. The optical element according to claim 1, wherein the liquid crystal layer is a cholesteric liquid crystal layer obtained by immobilizing a cholesteric liquid crystalline phase.

14. The optical element according to claim 1, wherein in a case where an in-plane retardation is measured from a normal direction of a main surface of the liquid crystal diffraction element and a direction tilted with respect to a normal line, a direction in which the in-plane retardation is the minimum in any one of a slow axis plane or a fast axis plane is tilted from the normal direction.

15. The optical element according to claim 1, wherein in a case where a length over which the direction of the optical axis derived from the liquid crystal compound in the liquid crystal alignment pattern of the liquid crystal layer rotates by 180° in an in-plane direction is set as a single period of a diffraction structure, single periods of the two or more liquid crystal layers are different from each other.

16. The optical element according to claim 15, wherein the liquid crystal diffraction element includes a first liquid crystal layer and a second liquid crystal layer, and in a case where a pitch of the first liquid crystal layer is represented by P1, a single period of the first liquid crystal layer is represented by Λ1, a pitch of the second liquid crystal layer is represented by P2, and a single period of the second liquid crystal layer is represented by Λ2, P1<P2 and

Λ1<Λ2 are satisfied.

17. The optical element according to claim 1, wherein periods of diffraction structures of the incidence diffraction element and the emission diffraction element are 0.1 μm to 1 μm.

18. An image display apparatus comprising:
the optical element according to claim 1; and
a display element that emits an image to the incidence diffraction element of the optical element.

19. The image display apparatus according to claim 18, wherein the display element emits polarized light.

20. The image display apparatus according to claim 19, wherein the display element emits circularly polarized light.

21. An optical element comprising:
a light guide element including a light guide plate, an incidence diffraction element, and an emission diffraction element, the incidence diffraction element being disposed on a main surface of the light guide plate and the emission diffraction element being disposed on the main surface of the light guide plate; and a positive lens that is disposed at a position overlapping the emission diffraction element in a view from a direction perpendicular to the main surface of the light guide plate, wherein the incidence diffraction element diffracts incident light such that the diffracted light is incident into the light guide plate, the emission diffraction element emits light propagating in the light guide plate from the light guide plate, and the positive lens collects the light that is emitted from the light guide plate by the emission diffraction element, the positive lens is a polarization diffraction element, the polarization diffraction element is a liquid crystal diffraction element that includes a liquid crystal layer including a liquid crystal compound, the liquid crystal layer has a liquid crystal alignment pattern in which a direction of an optical axis derived from the liquid crystal compound changes while continuously rotating in at least one in-plane direction,
the liquid crystal diffraction element includes two or more liquid crystal layers, and
in a cross section of each of the two or more liquid crystal layers observed with a scanning electron microscope, bright portions and dark portions derived from a liquid crystal phase are tilted with respect to a main surface of the liquid crystal layer, and
in a case where an interval between bright portions or between dark portions in a normal direction with respect to a tilted surface is set as ½ pitch, pitches of the liquid crystal layers are different from each other.

22. An optical element comprising:
a light guide element including a light guide plate, an incidence diffraction element, and an emission diffraction element,
the incidence diffraction element being disposed on a main surface of the light guide plate and
the emission diffraction element being disposed on the main surface of the light guide plate; and
a positive lens that is disposed at a position overlapping the emission diffraction element in a view from a direction perpendicular to the main surface of the light guide plate,
wherein the incidence diffraction element diffracts incident light such that the diffracted light is incident into the light guide plate,
the emission diffraction element emits light propagating in the light guide plate from the light guide plate, and
the positive lens collects the light that is emitted from the light guide plate by the emission diffraction element,
each of the incidence diffraction element and the emission diffraction element is a polarization diffraction element,
the polarization diffraction element is a liquid crystal diffraction element that includes a liquid crystal layer including a liquid crystal compound,
the liquid crystal layer has a liquid crystal alignment pattern in which a direction of an optical axis derived from the liquid crystal compound changes while continuously rotating in at least one in-plane direction,
the liquid crystal diffraction element includes two or more liquid crystal layers, and
in a cross section of each of the two or more liquid crystal layers observed with a scanning electron microscope, bright portions and dark portions derived from a liquid crystal phase are tilted with respect to a main surface of the liquid crystal layer, and
in a case where an interval between bright portions or between dark portions in a normal direction with respect to a tilted surface is set as ½ pitch, pitches of the liquid crystal layers are different from each other.

* * * * *